US011216385B2

(12) United States Patent
Park et al.

(10) Patent No.: US 11,216,385 B2
(45) Date of Patent: Jan. 4, 2022

(54) APPLICATION PROCESSOR, SYSTEM-ON CHIP AND METHOD OF OPERATING MEMORY MANAGEMENT UNIT

(71) Applicant: Samsung Electronics Co., Ltd., Suwon-si (KR)

(72) Inventors: Sung-Boem Park, Seoul (KR); Moinul Syed, Austin, TX (US); Ju-Hee Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 310 days.

(21) Appl. No.: 16/413,034

(22) Filed: May 15, 2019

(65) Prior Publication Data

US 2020/0364152 A1    Nov. 19, 2020

(51) Int. Cl.
   *G06F 12/1027*    (2016.01)
   *G06F 12/0871*    (2016.01)
   *G06F 12/1009*    (2016.01)

(52) U.S. Cl.
   CPC ...... *G06F 12/1027* (2013.01); *G06F 12/0871* (2013.01); *G06F 12/1009* (2013.01)

(58) Field of Classification Search
None
See application file for complete search history.

(56) References Cited

U.S. PATENT DOCUMENTS

| | | | |
|---|---|---|---|
| 5,222,222 A | 6/1993 | Mehring et al. | |
| 5,282,274 A | 1/1994 | Liu | |
| 6,157,986 A | 12/2000 | Witt | |
| 6,751,706 B2 | 6/2004 | Chauvel et al. | |
| 7,366,829 B1 | 4/2008 | Luttrell et al. | |
| 8,522,253 B1 | 8/2013 | Rozas et al. | |
| 9,436,616 B2 | 9/2016 | Sharp et al. | |
| 9,703,722 B2 | 7/2017 | Kujtkowski et al. | |
| 9,779,028 B1* | 10/2017 | Mukherjee | G06F 12/1063 |
| 2015/0055649 A1 | 2/2015 | DeCusatis et al. | |

(Continued)

OTHER PUBLICATIONS

Office Action dated Jan. 2, 2020, issued in corresponding German Patent Application No. 102019117783.9.

*Primary Examiner* — Gary W. Cygiel
(74) *Attorney, Agent, or Firm* — Harness, Dickey & Pierce, P.L.C.

(57) ABSTRACT

Memory management unit (MMU) in an application processor responds to an access request, corresponding to inspection request, including target context and target virtual address and the inspection request is for translating the target virtual address to a first target physical address. The MMU includes context cache, translation cache, invalidation queue and address translation manager (ATM). The context cache stores contexts and context identifiers of the stored contexts, while avoiding duplicating contexts. The translation cache stores first address and first context identifiers second addresses, the first address corresponds to virtual address, the first context identifiers corresponds to first context, and the second addresses corresponds to the first address and the first context. The invalidation queue stores at least one context identifier to be invalidated, of the context identifiers stored in the translation cache. The ATM controls the context cache, the translation cache and the invalidation queue.

19 Claims, 23 Drawing Sheets

(56) References Cited

U.S. PATENT DOCUMENTS

2015/0134931 A1\* 5/2015 Mukherjee .............. G06F 15/76
712/30
2016/0140048 A1\* 5/2016 Mukherjee ............ G06F 12/128
711/135
2018/0004664 A1 1/2018 Craddock et al.

\* cited by examiner

FIG. 4B
218
| TAG(219a) | | DATA(219b) |
|---|---|---|
| CID1 | VA1 | PA1 |
| CID1_a | VA1_a | PA1_a |
| CID1_a | VA1_b | PA1_b |
| CID1_a | VA1_c | PA1_c |
| CID1_b | VA1_d | PA1_d |
FIG. 4C
218a
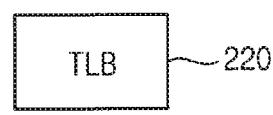
FIG. 4D
218b
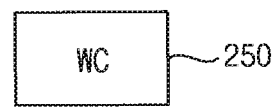

| VALID | TAG(217) | | | | DATA(219) | | |
|---|---|---|---|---|---|---|---|
| | ASID | VMID | NS | EL | VA | PA | AT |
| Y | 0xA | 0xB | 1 | 1 | 0x1000 | 0x9000 | R/W |
| Y | 0xA | 0xB | 1 | 1 | 0x6000 | 0xA000 | R/W |
| Y | 0xA | 0xB | 1 | 1 | 0x3000 | 0x0000 | R |
| Y | 0xA | 0xC | 1 | 1 | 0x8000 | 0x2000 | W |

230 —

| 0x7 |
|---|
| 0x3 |
| |
| |

210 —

| VALID | TAG(211) | | | | DATA(213) |
|---|---|---|---|---|---|
| | ASID | VMID | NS | EL | CID |
| Y | 0xA | 0xB | 1 | 1 | 0x4(CID11) | ← CTX11
| Y | 0xC | 0xB | 1 | 1 | 0x6(CID12) | ← CTX12

220 —

| VALID | TAG(221) | DATA(223) | | |
|---|---|---|---|---|
| | CID | VA | PA | AT |
| Y | 0x4(CID11) | 0x1000 | 0x9000 | R/W |
| Y | 0x4(CID11) | 0x6000 | 0xA000 | R/W |
| Y | 0x4(CID11) | 0x3000 | 0x0000 | R |
| Y | 0x6(CID12) | 0x8000 | 0x2000 | W |

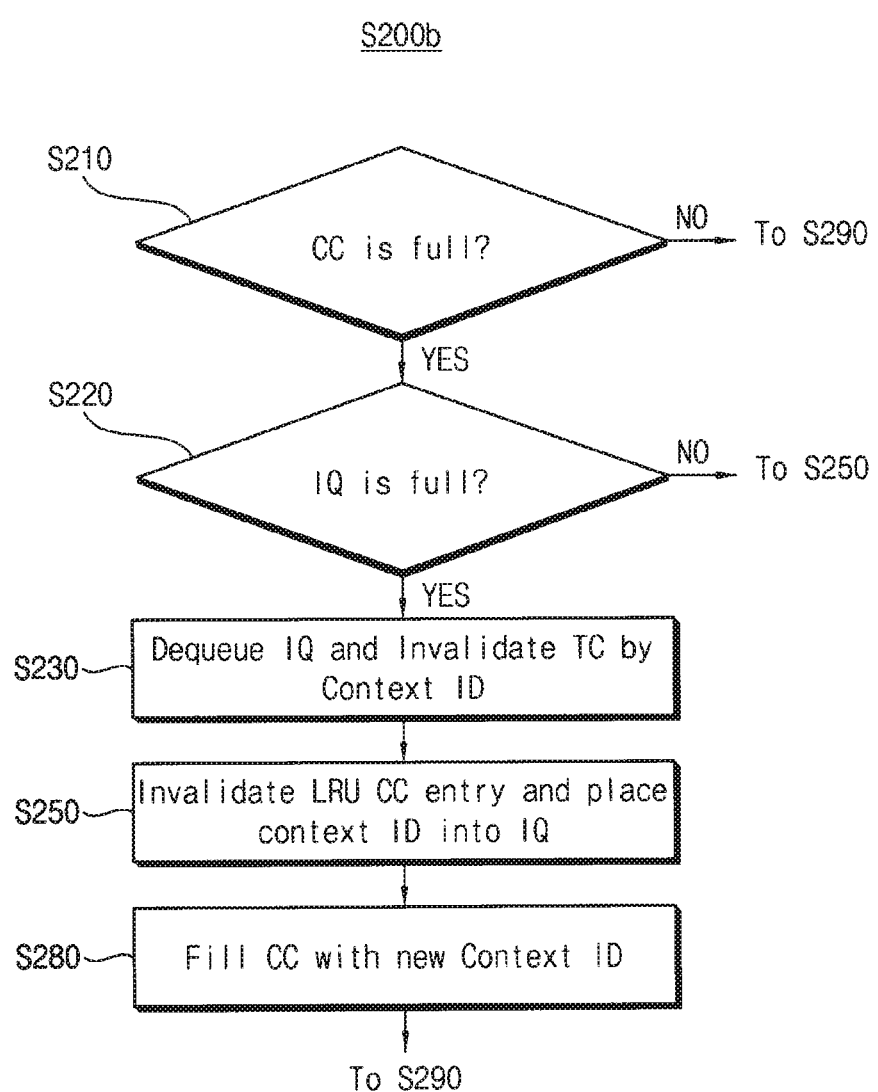

APPLICATION PROCESSOR, SYSTEM-ON CHIP AND METHOD OF OPERATING MEMORY MANAGEMENT UNIT

TECHNICAL FIELD

Example embodiments of the inventive concepts relate to processors, and more particularly, to an application processor, a system-on chip including the same and method of operating a memory management unit included in the application processor.

DISCUSSION OF RELATED ART

A memory management unit (MMU) is a hardware component that processes memory access requests issued by a direct memory access unit such as a central processing unit (CPU). The MMU may also be referred to as a paged MMU (PMMU).

Generally, the MMU initially attempts to utilize an associative cache called a Translation Lookaside Buffer (TLB) to translate virtual page addresses to the physical page addresses of a memory, such as an instruction memory. If no physical page address match for a virtual page address is located in the TLB, then the TLB executes a slower process in which a page table is referenced to determine the necessary physical page address. This can delay channel activity of the MMU.

SUMMARY

According to an example embodiment of the inventive concepts, an application processor includes a memory management unit (MMU). The MMU responds to an access request received from a master intellectual property (IP), and the access request includes a target context and a target virtual address. The access request corresponds to an inspection request for translating the target virtual address to a first target physical address. The MMU includes a context cache, a translation cache, an invalidation queue and an address translation manager (ATM). The context cache stores contexts and context identifiers of the stored contexts as a first tag and a first data, respectively, while avoiding duplicating contexts, and the contexts are used in the inspection request. The translation cache stores a first address and first context identifiers as a second tag and stores second addresses as a second data, the first address corresponds to a virtual address used in the inspection request, the first context identifiers corresponds to a first context used in the inspection request, and the second addresses corresponds to the first address and the first context. The invalidation queue stores at least one context identifier to be invalidated, of the context identifiers stored in the translation cache. The ATM controls the context cache, the translation cache and the invalidation queue.

According to an example embodiment of the inventive concepts, a system-on chip includes a master intellectual property (IP) to output an access request, an application processor and a memory device. The application processor includes a memory management unit (MMU) and the MMU translates a target virtual address to a first target physical address in response to the access request including a target context and the target virtual address. The memory device is coupled to the MMU and includes a page table that stores mapping information between virtual addresses and first physical addresses. The MMU includes a context cache, a translation cache, an invalidation queue and an address translation manager (ATM). The context cache stores contexts and context identifiers of the stored contexts as a first tag and a first data, respectively, while avoiding duplicating contexts, and the contexts are used in the access request corresponding to an inspection request. The translation cache stores a first address and first context identifiers as a second tag and stores second addresses as a second data, the first address corresponds to a virtual address used in the inspection request, the first context identifiers corresponds to a first context used in the inspection request, and the second addresses corresponds to the first address and the first context. The invalidation queue stores at least one context identifier to be invalidated, of the context identifiers stored in the translation cache. The ATM controls the context cache, the translation cache and the invalidation queue.

According to an example embodiment of the inventive concepts, in a method of operating a memory management unit (MMU) of an application processor, an access request including a target context and a target virtual address is received by an address translation manager (ATM). It is determined by the ATM, whether the target context matches at least one of first entries in a context cache by inspecting the context cache, and the context cache stores contexts and context identifiers of the stored contexts as a first tag and a first data, respectively, while avoiding duplicating contexts. It is determined by the ATM whether a target context identifier corresponding to the target context match at least one of second entries in a translation cache by selectively inspecting the translation cache based on inspecting the context cache, and the translation cache stores the context identifiers virtual addresses corresponding to the context identifiers as second tag and stores physical addresses corresponding to the virtual addresses as second data. The target virtual address to a corresponding target physical address is translated to a corresponding target physical address based on the selective determining.

Accordingly, the MMU in the application processor according to example embodiments, may translate a virtual address to a physical address by inspecting the context cache primarily, which stores contexts while avoiding duplicating contexts, and by selectively inspecting the translation cache based on a result of inspecting the context cache. Therefore, a size of the translation cache may be reduced. In addition, performance of the application processor may be enhanced by processing an invalidation request in the background when the translation cache is not used, when the invalidation request designates a context-based invalidation.

BRIEF DESCRIPTION OF THE DRAWINGS

The above and other features of the inventive concepts will be more clearly understood by describing in detail example embodiments thereof with reference to the accompanying drawings.

FIG. 4B illustrates an example of the translation cache in FIG. 4A according to example embodiments.

FIG. 4C illustrates an example of the translation cache in FIG. 4B according to example embodiments.

FIG. 4D illustrates another example of the translation cache in FIG. 4B according to example embodiments.

FIGS. 6A and 6B illustrate a portion of the MMU in FIG. 5, respectively, according to example embodiments.

FIG. 12 illustrates that a new context identifier is allocated in FIG. 7 according to example embodiments.

DETAILED DESCRIPTION OF THE EMBODIMENTS

Figure 1:
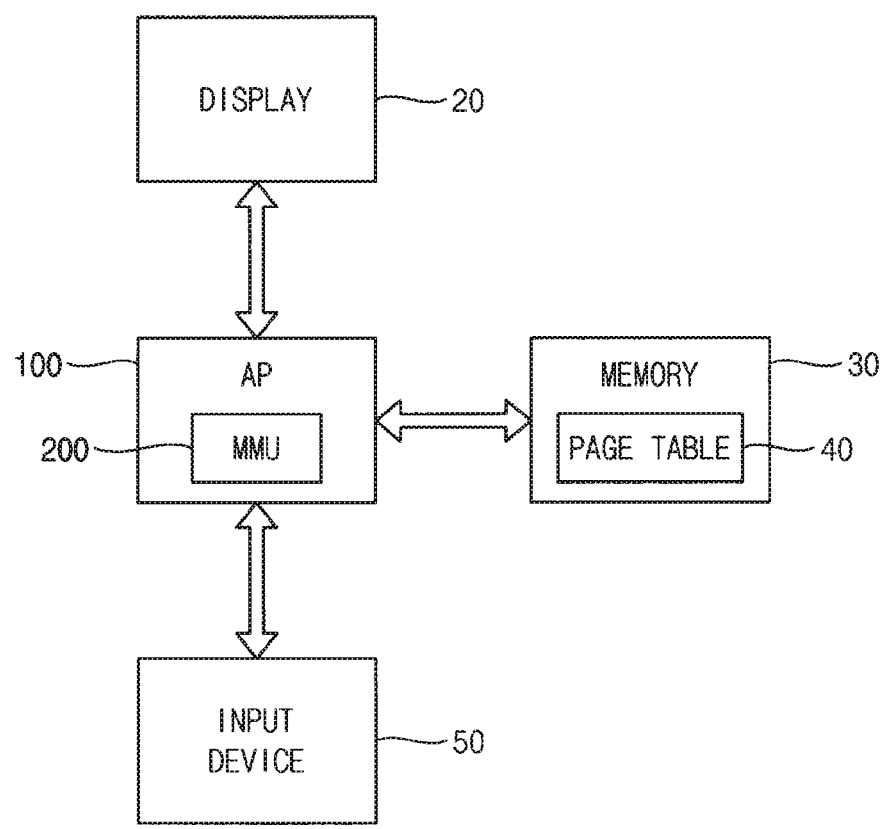
FIG. 1 is a diagram of a system-on chip (SoC) including a memory management unit (MMU) according to example embodiments.

Example embodiments of the inventive concepts will be described more fully hereinafter with reference to the accompanying drawings. Like reference numerals may refer to like elements throughout this application.

FIG. 1 is a diagram of a system-on chip (SoC) including a memory management unit (MMU) according to example embodiments.

Referring to FIG. 1, an SoC 10 may be implemented as any of a large array of electronics devices, examples including a personal computer (PC), a tablet PC, a netbook, an e-reader, a personal digital assistant (PDA), a portable multimedia player (PMP), an MP3 player and an MP4 player. The SoC 10 may include an application processor 100 that executes program instructions to control an overall operation of the SoC 10. The SoC 10 may further include a display 20, a memory device 30 and an input device 50.

For example, the application processor 100 may receive program instructions via the input device 50. In example embodiments, the application processor 100 executes program instructions by reading data from the memory device 30, and displaying the data on the display 20. The input device 50 may include a keypad, a keyboard, and point-and-touch devices such as a touch pad and a computer mouse.

The memory device 30 may include a page table 40 that stores mapping information between virtual addresses and physical addresses.

Figure 2:
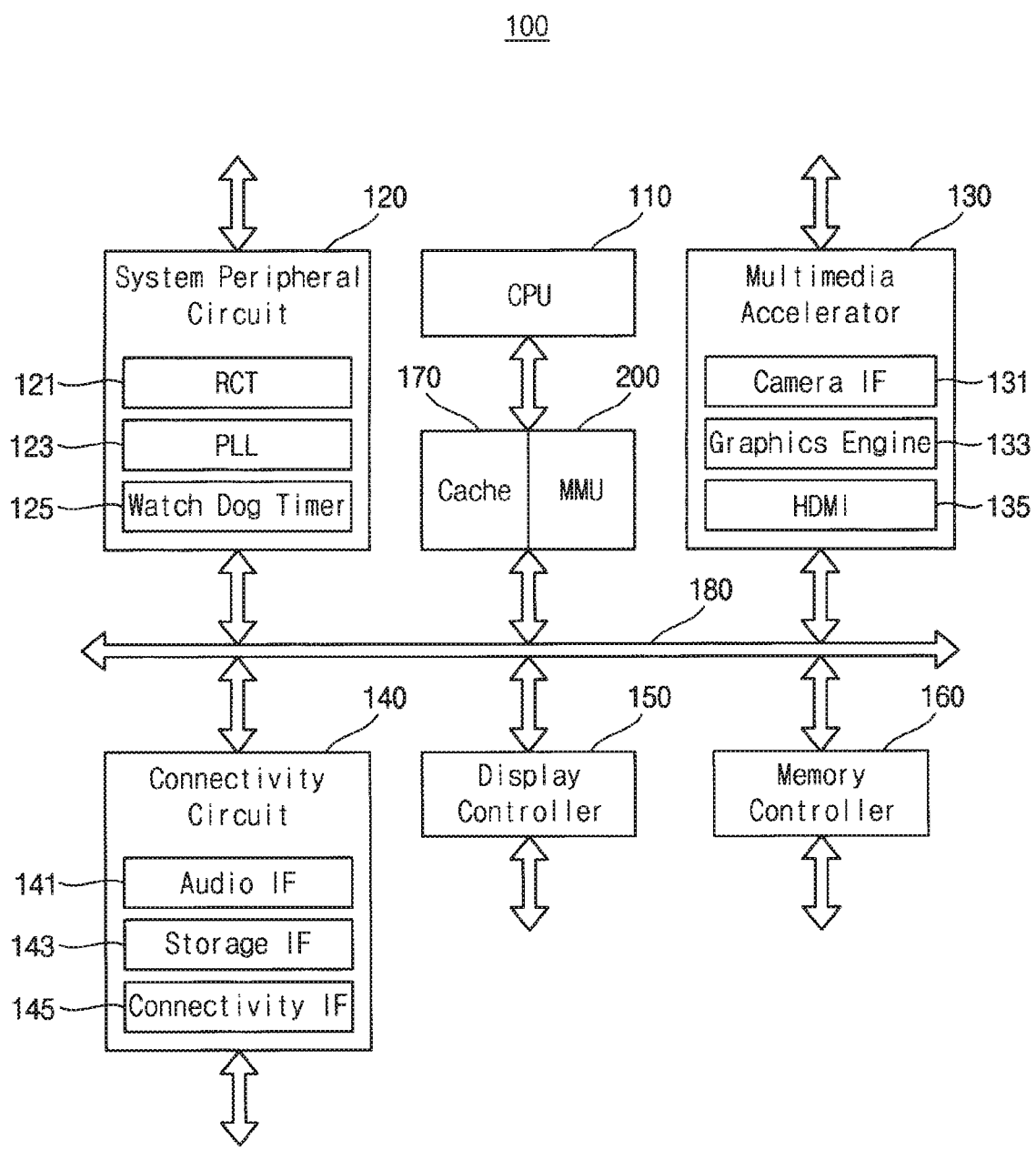
FIG. 2 is a block diagram illustrating an example of the application processor in FIG. 1 according to example embodiments.

FIG. 2 is a block diagram illustrating an example of the application processor in FIG. 1 according to example embodiments.

Referring to FIG. 2, the application processor 100 includes a central processing unit (CPU) 110, a cache 170, the MMU 200, a system bus 180, a system peripheral circuit 120, a multimedia accelerator 130, a connectivity circuit 140, a display controller 150, and/or a memory controller 160.

The CPU 110 executes received program instructions. The cache 170 is a high-speed memory which stores selected data, e.g., frequently accessed data, in order to reduce an average latency of memory access operations by the CPU 110. The MMU 200 is a hardware component which processes a request from the CPU 110 to access to the memory device 30.

Functionality of the MMU 200 may include translating virtual addresses into physical addresses, memory protection, controlling the cache 170, bus arbitration, and/or bank switching.

The system peripheral circuit 120, the multimedia accelerator 130, the connectivity circuit 140, the display controller 150 and/or the memory controller 160 communicate data or instructions with one another via the system bus 180.

The system bus 180 may include a plurality of channels, such as a read data channel, a read address channel, a write address channel and/or a write data channel.

The system peripheral circuit 120 includes a real-time clock (RTC) 121, a phase-locked loop (PLL) 123 and/or a watch dog timer 125.

The multimedia accelerator 130 includes a graphic engine 133. The multimedia accelerator 130 may further include a camera interface 131, a graphics engine integrated with a frame buffer performing graphic calculation or a video display circuitry and/or a high-definition multimedia interface (HDMI) 135 which is an audio/video interface for transmitting uncompressed digital data. It is noted here that the MMU 200 may be used to translate a virtual address output from the graphics engine 133 into a physical address.

Accordingly, the example embodiments of the inventive concepts may be applied to various memory devices and various application which ensure operation stability with maintaining or enhancing operation performance.

The connectivity circuit 140 may include an audio interface 141, a storage interface 143 like an advanced technology attachment (ATA) interface, and/or a connectivity interface 145. The connectivity circuit 140 may communicate with the input device 50.

The display controller 150 controls data to be displayed in the display 20. The MMU 200 may be used to translate a virtual address output from the display controller 150 into a physical address.

The memory controller 160 enables the memory device 30 to be accessible according to the type of memory (e.g., flash memory or dynamic random access memory (DRAM)).

Figure 3:
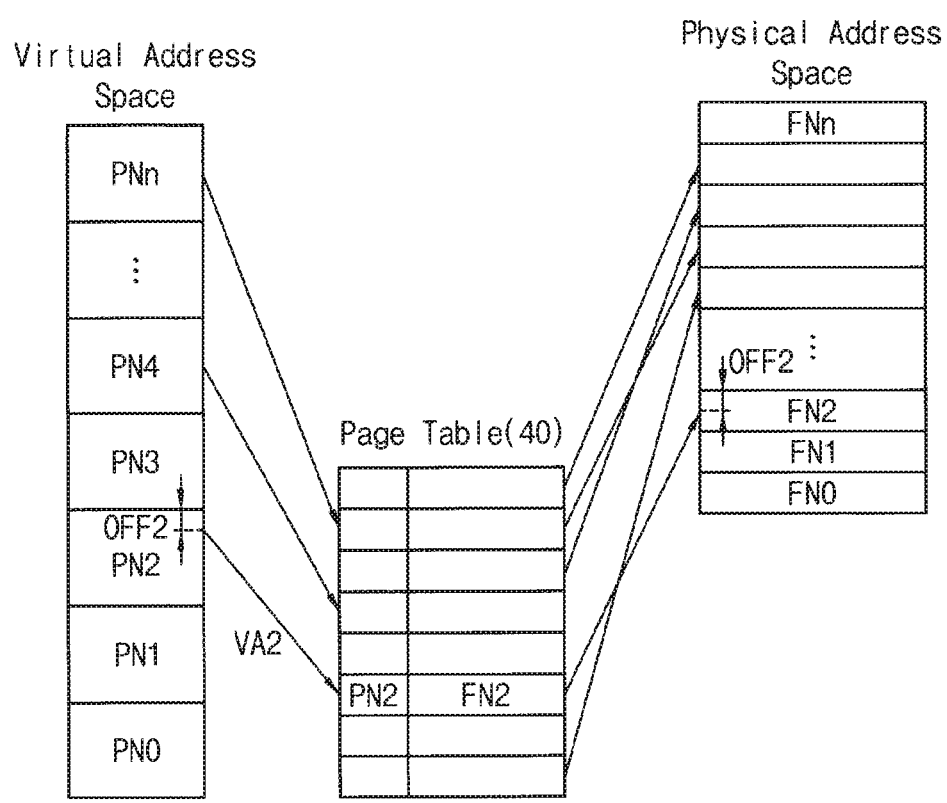
FIG. 3 is a diagram showing mapping between virtual addresses and physical addresses.

FIG. 3 is a diagram showing mapping between virtual addresses and physical addresses.

Referring to FIGS. 1 through 3, a virtual address space may be divided into a plurality of pages PN0 through PNn, where, n is an integer greater than two.

Each of the pages PN0 through PNn is a block of adjacent virtual addresses. Each of the pages PN0 through PNn has a given data size of, for example, 4 KB. However, the size of the pages PN0 through PNn is not limited and may be changed.

Like the virtual address space, a physical address space may be divided into a plurality of frames FN0 through FNn. Each of the frames FN0 through FNn has a fixed size.

A virtual address, e.g., VA2, includes a page number, e.g., PN2, and an offset, e.g., OFF2, within a page. In other words, the virtual address may be expressed by Equation 1:

$$VAi = PNj + OFFx \quad (1)$$

where 'i', 'j' and 'x' are 1 or a natural number greater than 1, VAi is a virtual address, PNj is a page number, and OFFx is an offset.

The page number PN2 is used as an index in the page table 40.

The offset OFF2 is combined with a frame number, e.g., FN2, defining a physical address, e.g., PA2. The physical address may be expressed by Equation 2:

$$PAr = FNs + OFFx \quad (2)$$

where 'r', 's' and 'x' 1 or a natural number greater than 1, PAr is a physical address, FNs is a frame number, and OFFx is an offset.

The page number PA2 may be referred to as a virtual page number and the frame number FN2 may be referred to as a physical page number.

The page table 40 has a mapping between a virtual address of a page and a physical address of a frame.

For convenience of explanation, in the description, it is assumed that processors such as the CPU 110, the graphic engine 133, and the display controller 150 that process data in each working set each are referred to as a master intellectual property (IP). The master IP may operate for each working set and may process a plurality of working sets at a time. A working set is a data set stored in the memory device 30. The working set indicates a set of pages referred to frequently, for example above a reference number of times in a reference period of time, in the memory device 30 by the master IP or the amount of pages that can be loaded from the master IP to the memory device 30. In example embodiments, in the master IP each working set is managed independently from other working sets.

Figure 4A:
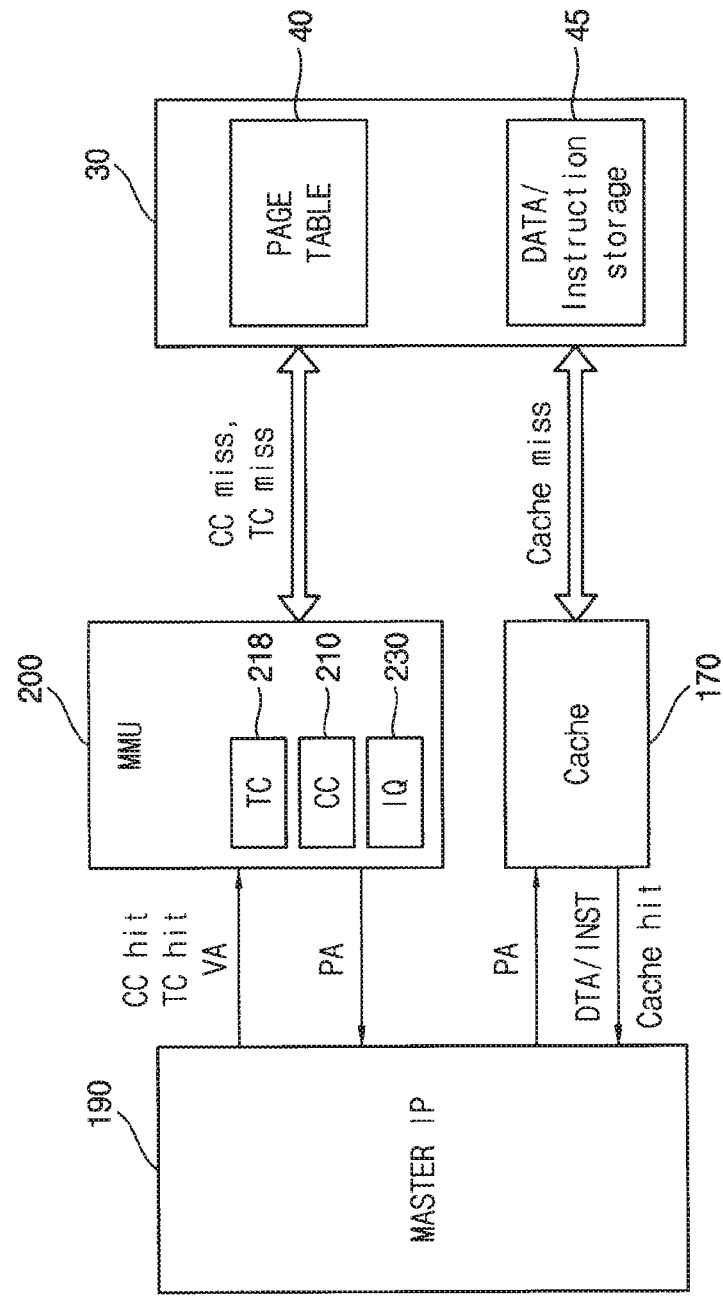
FIG. 4A is a diagram for explaining operation of the MMU in FIG. 1 according to example embodiments.

FIG. 4A is a diagram for explaining operation of the MMU in FIG. 1 according to example embodiments.

Referring to FIGS. 1, 2 and 4A, the MMU 200 includes a translation cache 218, a context cache 210 and/or an invalidation queue 230 and is connected to the master IP 190 and the memory device 30 through a plurality of channels.

The master IP 190 processes a working set. The master IP 190 outputs an access request corresponding to the working set to MMU 200 or the cache 170. The access request may include a virtual address VA on the working set in the memory device 30 and a context on attributes on the working set. The access request may include one of an inspection request and an invalidation request.

The MMU 200 calculates a physical address PA using the virtual address VA based on the access request of the master IP 190. Alternatively, the MMU 200 may invalidate at least one of entries in the translation cache 218 based on the access request of the master IP 190.

The context cache 210 stores contexts associated with attributes of the access requests as a first tag while avoiding duplicating entries, and/or stores context identifiers of the contexts as a first data. When the access request correspond to the inspection request, the context cache 210 may store contexts used in the inspection request as the first tag while avoiding duplicating entries and may store context identifiers of the contexts as the first data.

The translation cache 218 may store a first address and first context identifiers as a second tag and may store a first address and first context identifiers as a second tag and may store second addresses as a second data. The first address corresponding to a virtual address used in the inspection request and the first context identifiers correspond to a first context used in the inspection request. The second addresses correspond to the first address and the first context.

The translation cache 218 may include a translation lookaside buffer (TLB) or a walk cache.

The TLB is memory management hardware used to increase a virtual address translation speed. The TLB stores a mapping between a page number PN and a frame number FN. The TLB stores mapping information among context identifiers, the virtual address VA and the physical address PA associated with pages referred to by the master IP 190. The TLB stores the context identifiers and the virtual addresses as the second tag and stores the physical addresses corresponding to the virtual addresses as the second data.

The walk cache stores a portion of the virtual address and stores a physical address designating a location of the page table corresponding to the portion of the virtual address.

When translating a virtual address into a physical address, the MMU 200 checks the context cache 210 first. If the context associated with the virtual address VA corresponding to the request of the master IP 190 matches at least one of entries in the context cache 210 (which is called TC hit), the context cache 210 provides the translation cache 218 with a context identifier corresponding to the matched context.

If mapping information corresponding to the virtual address VA is in the translation cache 218 (which is called a TC hit), the MMU 200 directly processes the translation without accessing the memory device 30 and reading mapping information from the memory device 30.

If the context associated with the VA corresponding to the request of the master IP 190 does not match any or all of the entries in the context cache 210 (which is called CC miss), or if no match found in the translation cache 218 with regard to the matched context identifier and the virtual address VA (which is called TC miss), a page table walk is performed.

The page table walk is a process of finding out whether the page number PN and the frame number FN of the virtual address VA are matched in the page table 40 stored in the memory device 30 when the context associated with the VA corresponding to the request of the master IP 190 does not match any or all of the entries in the context cache 210 or when the frame number FN of the virtual address VA is not matched with the page number PN in the translation cache 218 (that is, mapping information between the virtual address VA and the physical address PA is not found in the translation cache 218). The page table 40 stores mapping information between a virtual address and a physical address of each data in the memory device 30.

When the master IP 190 attempts to read an instruction or data using the physical address PA and the instruction or the data corresponding to the physical address PA is in the cache 170, the cache 170 may output the instruction or the data to the master IP 190 directly, without accessing the memory device 30 (which is referred to as 'Cache hit').

However, when the instruction or the data does not exist in the cache 170, the cache 170 may access a data/instruction storage block 45 in the memory device 30 to read the instruction or the data (which is referred to as 'Cache miss'). The data/instruction storage block 45 stores information about each of the data/instructions in the memory device 30.

The invalidation queue 230 may store at least one context identifier to be invalidated, among the context identifiers stored in the translation cache 218.

FIG. 4B illustrates an example of the translation cache in FIG. 4A according to example embodiments.

Referring to FIG. 4B, the translation cache 218 includes a tag field 219a and a data field 219b.

The tag field 219a may store a context identifier CID1 and a virtual address VA1 and the data field 219b mays store a physical address PA1 corresponding to the virtual address VA1.

For example, it is assumed that context identifiers CID1_a and CID1_b are used in the inspection request. In example embodiments, the context identifier CID1_a and virtual addresses VA1_a, VA1_b and VA1_c corresponding to the context identifier CID1_a are stored in the tag field 219a, and the context identifier CID1_b and a virtual address VA1_d are stored in the tag field 219a. In addition, physical addresses PA1_a, PA1_b. PA1_c and PA1_d corresponding to the virtual addresses VA1_a, VA1_b, VA1_c and VA1_d, respectively, are stored in the data field 291b. The virtual addresses VA1_a, VA1_b, VA1_c and VA1_d stored in the tag field 219a may be referred to as first addresses and the physical addresses PA1_a, PA1_b. PA1_c and PA1_d stored in the data field 219b may be referred to as second addresses.

FIG. 4C illustrates an example of the translation cache in FIG. 4B according to example embodiments.

Referring to FIG. 4C, a translation cache 218a may include a TLB 220. Configuration of the TLB 220 will be described with reference to FIG. 6A.

FIG. 4D illustrates another example of the translation cache in FIG. 4B according to example embodiments.

Referring to FIG. 4D, a translation cache 218b may include a walk cache 250. Configuration of the walk cache 250 will be described with reference to FIG. 6B.

Figure 5:
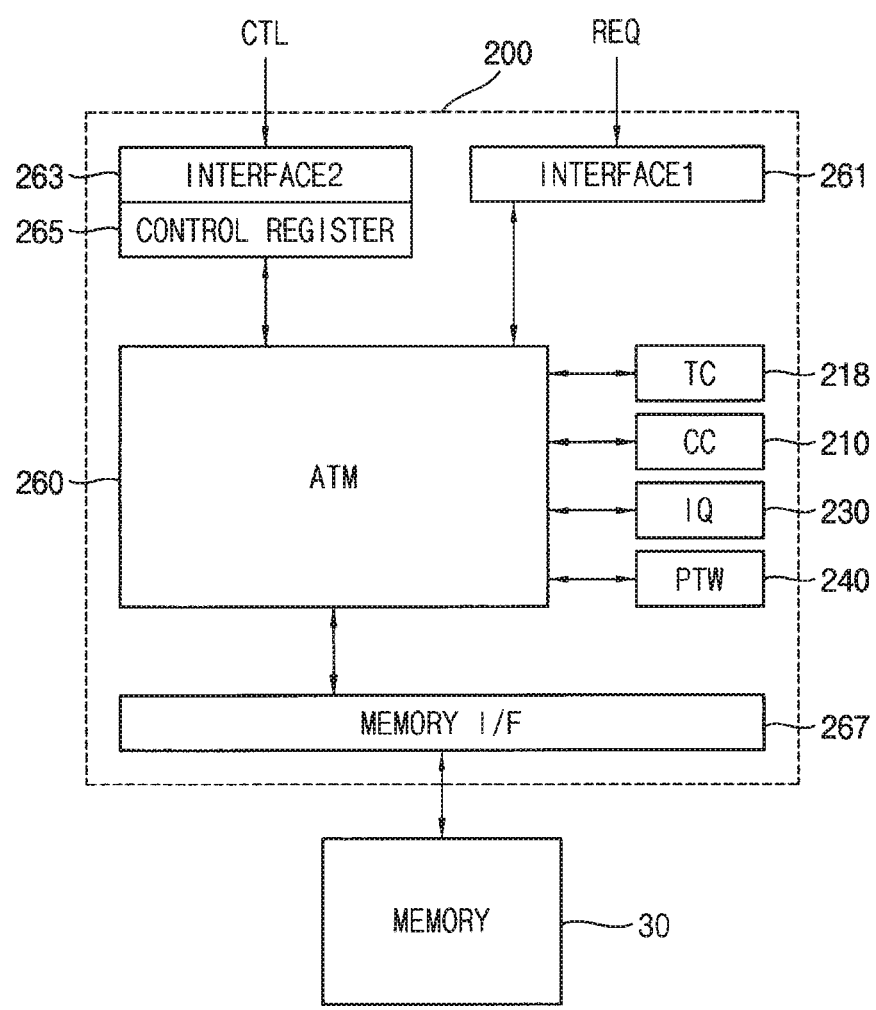
FIG. 5 is a block diagram illustrating an MMU in the SoC of FIG. 1 according to example embodiments.

FIG. 5 is a block diagram illustrating an MMU in the SoC of FIG. 1 according to example embodiments.

Referring to FIG. 5, the MMU 200 includes a first interface 261, a second interface 263, a memory interface 267, an address translation manager (ATM) 260, the context cache 210, the translation cache 218, the invalidation queue 230, a page table walker 240 and/or a control register 265.

The first interface 261 provides interfacing with the master IP 190. The first interface 216 may have an interfacing structure corresponding to, for example, an advanced extensible interface (AXI) protocol.

The master IP 190 may transfer access request REQ to the MMU 200 through the first interface 261.

The second interface 263 is a separate slave interface to set the control register 265. For example, the CPU 110 (see FIG. 2) may control a specific operation of the MMU 200 through the second interface 263 The second interface 263 may communicate with the CPU 110 according to, for example, an advanced peripheral bus (APB) protocol. The MMU 200 may receive a control signal CTL from the CPU 110.

The ATM 260 operates to perform the translation of a virtual address VA included in the access request REQ to a physical address PA.

The ATM 260 primarily inspects (searches or looks-up) the context cache 210 to translate a virtual address VA provided from the master IP 190 through address channels to a physical address PA.

When a context associated with the virtual address VA is present in the context cache 210 (CC hit), the context cache 210 provides the ATM 260 with a context identifier corresponding to the context associated with the virtual address VA. The ATM 260 inspects the translation cache 218 based on the context identifier. When the context identifier provided from the context cache 210 is present in the translation cache 218 (TC hit, that is, if the context identifier provided from the context cache 210 matches at least one of entries in the translation cache 218), the ATM 260 may generate a physical address PA by referring to the context identifier and the virtual address.

If the context associated with the virtual address VA is not present in the context cache 210 (CC miss), or if the context identifier provided from the context cache 210 does not match any or all of the entries in the translation cache 218 (TC miss), the ATM 260 controls the page table walker 240 to perform a page table walk on the page table 40.

Information that is used to control the operation of the MMU 200 is stored in the control register 265. The ATM 260 may control the context cache 210, the translation cache 218, the invalidation queue 230 and/or the page table walker 240 based on the information stored in the control register 265.

The memory interface 267 provides interfacing for communication with the memory device 30. The MMU 200 may read the page table 40 in the memory device 30 through the memory interface 267 or may access the data/instruction storage block 45 in the memory device 30 through the memory interface 267.

Figure 6B:
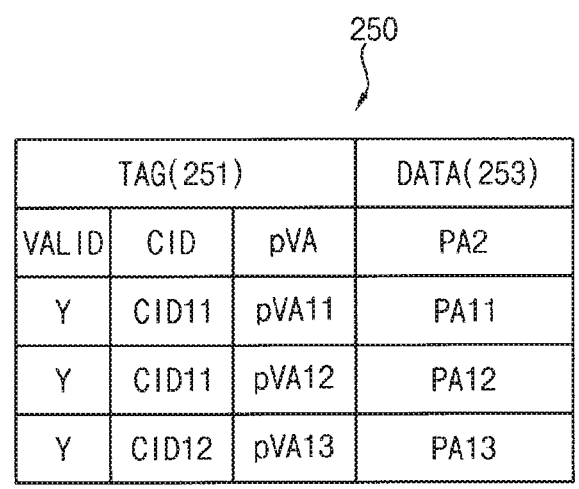

FIGS. 6A and 6B illustrate a portion of the MMU in FIG. 5, respectively, according to example embodiments.

FIG. 6A illustrates that the translation cache 218 in FIG. 5 is implemented with the TLB 220 and FIG. 6B illustrates that the translation cache 218 in FIG. 5 is implemented with the walk cache 250.

In FIG. 6A, the context cache 210, the TLB 220 and the invalidation queue 230 are illustrated and in FIG. 6B, the walk cache 250 is illustrated. In addition, a conventional TLB 215 is illustrated for comparing the TLB 220 in FIG. 6A.

Referring to FIG. 6A, the context cache 210 includes a tag field 211 and a data field 213. The tag field 211 stores contexts as a first tag, which are used in the inspection request of the master IP 190 while avoiding duplicating contexts. Each of the contexts may include valid information (VALID), an address space identifier (ASID) to identify an address space, a virtual machine identifier (VMID) to identify a virtual machine, a non-secure field NS associated with whether to be secured and an exception level filed EL associated with an exception field. The data field 213 includes a context identifier CID of each of the contexts.

For example, a context CTX11 may have a VALID of 'Y', an ASID of '0xA', a VMID of '0xB', an NS of '1', an EL of '1' and a context identifier CID11 of '0x4'. In addition, a context CTX12 may have a VALID of 'Y', an ASID of '0xC', a VMID of '0xB', an NS of '1', an EL of '1' and a context identifier CID12 of '0x6'.

The TLB 220 includes a tag field 221 and a data field 223. The tag field 221 stores context identifier CID and virtual address VA corresponding to the context identifier CID and the data field 223 stores physical address corresponding to the virtual address VA and authority information AT associated with whether to permit read (R)/write (W) access. Each of entries in the tag field 221 of the TLB 220 may further include valid information (VALID). The tag field 221 of the TLB 220 may store, as a second tag, virtual addresses (first addresses) and used in the inspection request and context identifiers of the contexts, and the data field 223 of the TLB 220 may store physical addresses corresponding to the first address and the context identifiers as second addresses.

For example, the context identifier CID11 may have virtual addresses of '0x1000', '0x6000' and '0x3000'. The context identifier CID12 may have a virtual address of '0x8000'.

The virtual address '0x1000' may have a physical address of '0x9000' and an AT of 'R/W'. The virtual address '0x6000' may have a physical address of '0A9000' and an AT of 'R/W'. The virtual address '0x3000' may have a physical address of '0x0000' and an AT of a'. The virtual address '0x8000' may have a physical address of '0x2000' and an AT of 'W'.

The invalidation queue 230 stores context identifiers of '0x7' and '0x3' as invalidation entries.

The walk cache 250 includes a tag field 251 and a data field 253. The tag field 251 stores context identifier CID and partial virtual address pVA corresponding to the context identifier CID and the data field 253 stores second physical address PA2 designating a location of the page table 40, which corresponds to the partial virtual address pVA. Each of entries in the tag field 251 of the walk cache 250 may further include valid information (VALID).

For example, the context identifier CID11 may have partial virtual addresses of 'pVA11' and 'pVA12'. The context identifier CID12 may have a partial virtual address of 'pVA13'. The partial virtual addresses 'pVA11', 'pVA12' and 'pVA13' designate locations in the page table 40, which are specified by physical addresses PA11, PA12 and PA13, respectively.

As is noted from FIG. 6A, the context identifier CID11 have different virtual addresses with respect to one context identifier. Therefore, the ATM 260 may translate a virtual address VA to a physical address PA by inspecting primarily the context cache 210 for determining whether a target context included in the access request of the master IP 190 matches at least one of entries of the tag field 211 in the context cache 210 and by selectively inspecting the TLB 220 based on a result of inspecting the context cache 210.

Since the context cache 210 stores the contexts while avoiding duplicating contexts, occupied area of the context cache 210 may be reduced. In addition, the TLB 220 does not store ASID and VMID which have relatively more bits, configuration of the TLB 220 may be simplified.

In addition, if the target context does not match any or all of entries of the tag field 211 of the context cache 210, a page table walk is performed without inspecting the TLB 220, and thus performance of the MMU 200 may be enhanced.

On the contrary, since the conventional TLB 215, which includes a tag field 217 and a date field 219, stores ASID and VMID having relatively more bits, a size of the TLB 215 is increased and a more time is needed for inspecting the TLB 215 to determine whether the target context matches entries of the TLB 215.

Figure 7:
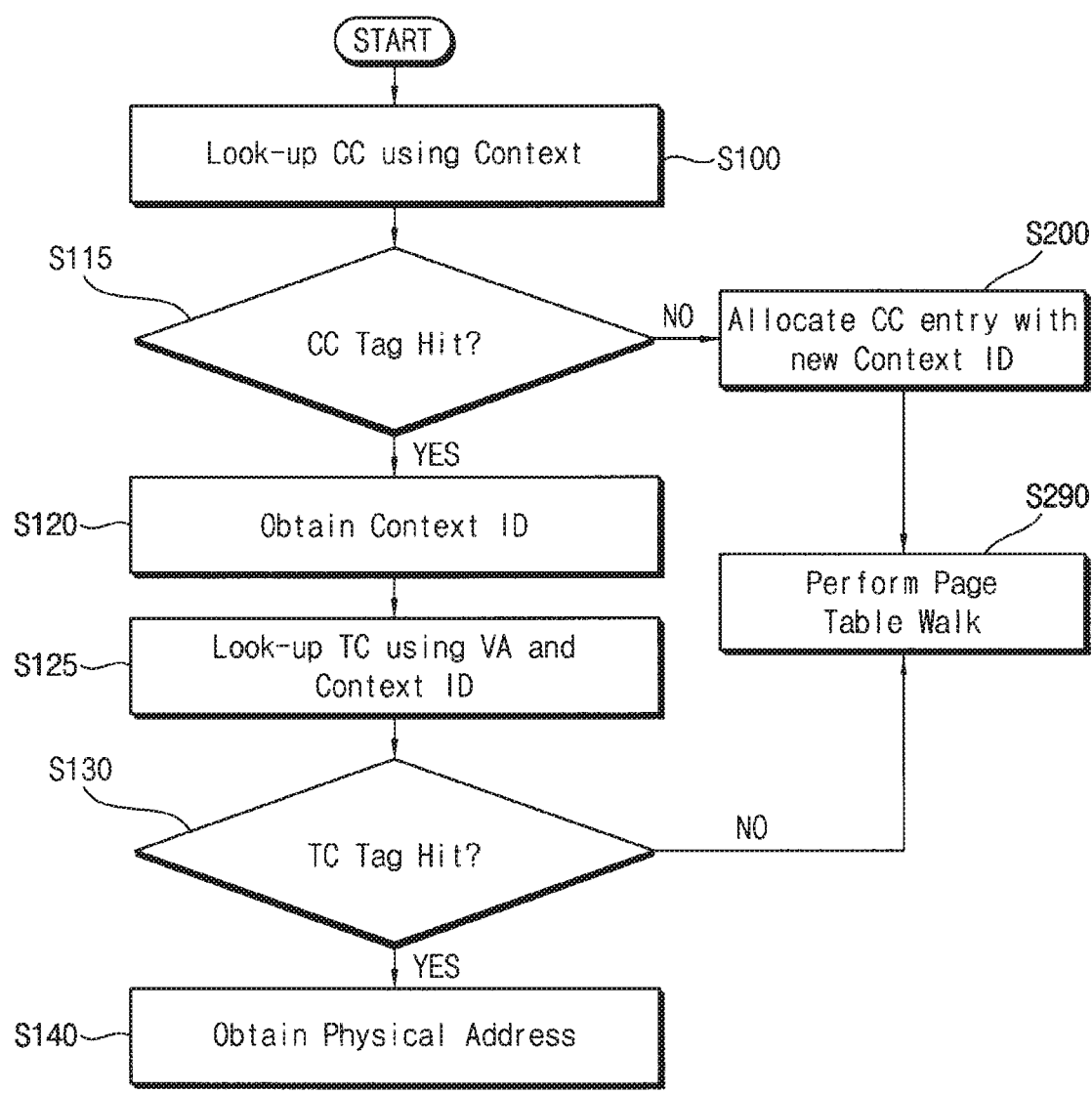
FIG. 7 is a flow chart illustrating an example operation of the MMU in FIG. 5 according to example embodiments.
Figure 8:
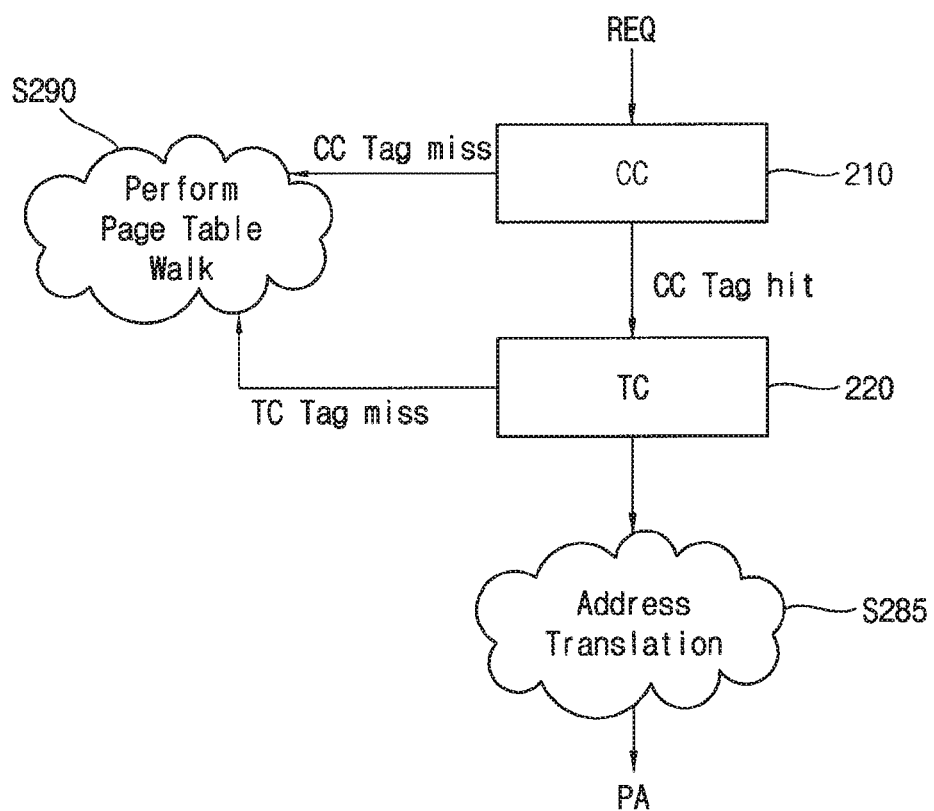
FIG. 8 is a diagram for explaining operation in FIG. 7.

FIG. 7 is a flow chart illustrating an example operation of the MMU in FIG. 5 according to example embodiments and FIG. 8 is a diagram for explaining operation in FIG. 7.

Referring to FIGS. 5 through 8, when the ATM 260 receives the access request REQ from the master IP 190, the ATM 260 inspects (looks-up) the context cache 210 based on a target context included in the access request REQ (operation S100), and determines whether the target context matches at least one of first entries in the context cache 210, (CC Tag Hit? in operation S115).

If the target context does not match with any or all of the first entries in the context cache 210 (NO in S115), the ATM 260 allocates the target context to a new context identifier (ID) (operation S200) and controls the page table walker 240 to perform a page table walk on the page table 40 (operation S290).

If the target context matches one (or at least one) of the first entries in the context cache 210 (YES in S115), the ATM 260 obtains a context identifier (context ID) corresponding to the target context (S120). The ATM 260 inspects the translation cache (TC) 218 based on the obtained context identifier and the target virtual address (operation S125) and determines whether the obtained context identifier and the target virtual address matches one of second entries in the translation cache 218 (TC Tag Hit? in operation S130).

If the obtained context identifier and the target virtual address matches all of the second entries in the translation cache 218 (NO in S130), the ATM 260 controls the page table walker 240 to perform a page table walk on the page table 40 (operation S290).

If the obtained context identifier and the target virtual address matches one of the second entries in the translation cache 218 (YES in S130), the ATM 260 obtains a physical address PA corresponding to the target virtual address (operation S140) and performs an address translation to provide the physical address PA to the master IP 190 (operation S285).

Figure 9A:
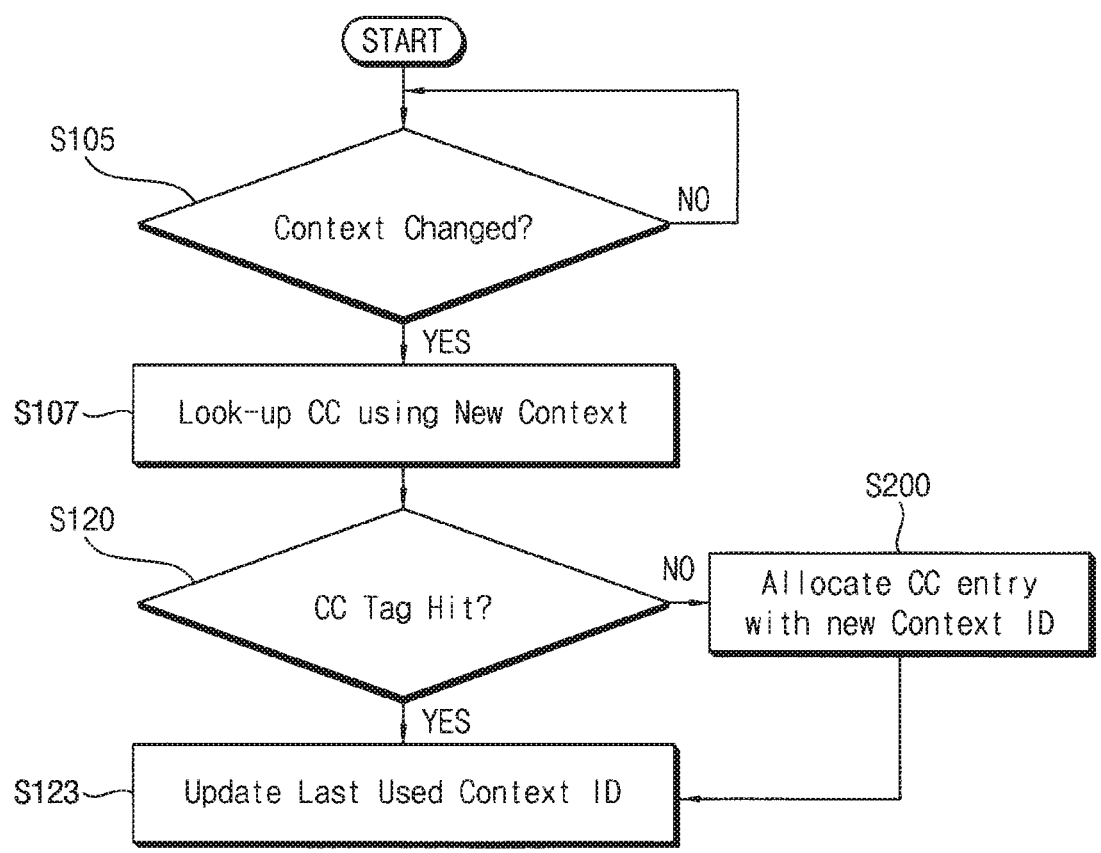
FIG. 9A is a flow chart illustrating another example operation of the MMU in FIG. 5 according to example embodiments.

FIG. 9A is a flow chart illustrating another example operation of the MMU in FIG. 5 according to example embodiments.

Referring to FIGS. 5and 9A, the ATM 260 determines whether a context which is currently used is changed (operation S105).

If the context which is currently used is not changed (NO in S105), the ATM 260 performs the operation S105.

If the context which is currently used is changed (YES in S105), the ATM 260 inspects the context cache 210 based on the changed context (operation S107).

The ATM 260 determines the changed context matches at least one of first entries in the context cache 210 (operation S120). If the changed context does not match any or all of the first entries in the context cache 210 (NO in S120), the ATM 260 allocates the changed context to a new context identifier (ID) (operation S200) and stores the changed context in the context cache 210.

If the changed context matches at least one of the first entries in the context cache 210 (YES in S120), the ATM 260 updates the context cache 210 by allocating the matched entry as a first context identifier (operation S123).

Since the change of the context rarely occur, the operations S107, S120 and S123 may be bypassed.

Figure 9B:
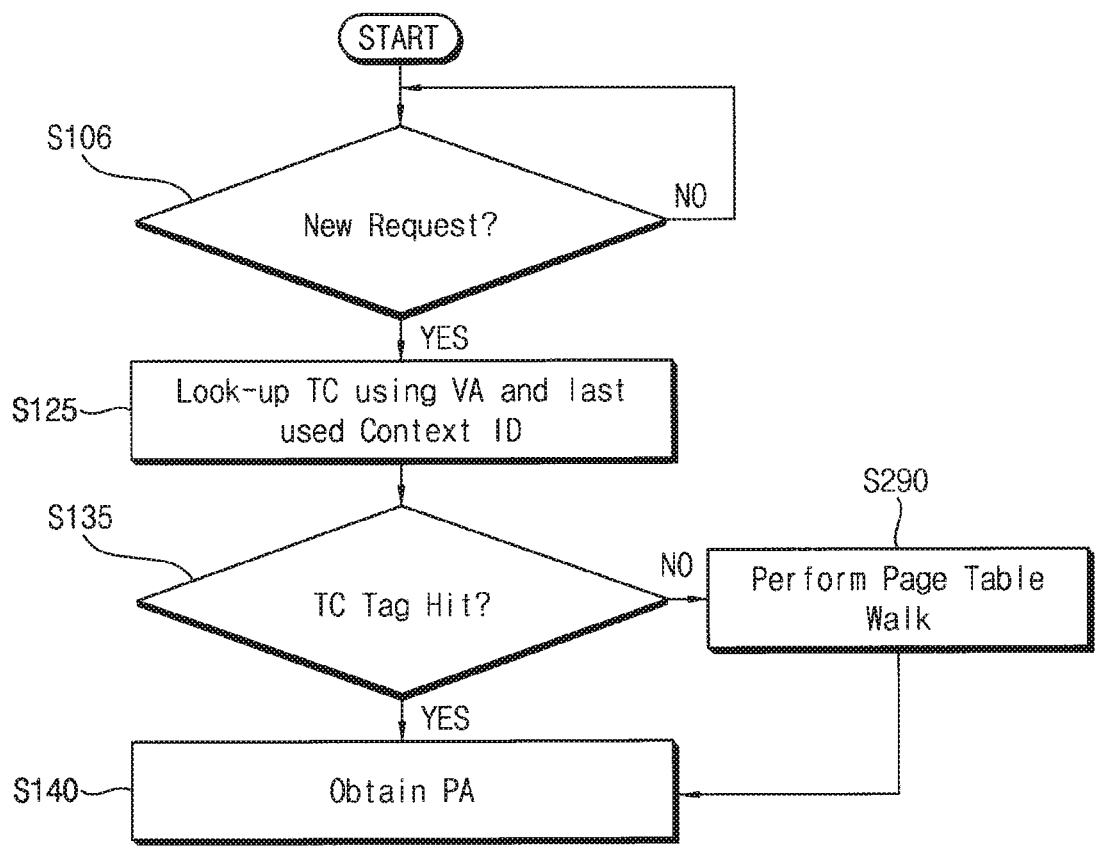
FIG. 9B is a flow chart illustrating another example operation of the MMU in FIG. 5 according to example embodiments.

FIG. 9B is a flow chart illustrating another example operation of the MMU in FIG. 5 according to example embodiments.

Referring to FIGS. 5and 9B, the ATM 260 determines whether a new request is received from the master IP 190 (operation S106). If the new request is not received from the master IP 190 (NO in S106), the ATM 260 performs the operation S106. If the new request is not received from the master IP 190 (YES in S106), the ATM 260 inspects the translation cache 218 based on the last used context identifier and a virtual address VA included in the new request (operation S125).

The ATM 260 determines the last used context identifier and the virtual address VA match at least one of second entries in the translation cache 218 (operation S135). If the last used context identifier and the virtual address VA do not match all of the second entries in the translation cache 218 (NO in S290), the ATM 260 controls the page table walker 240 to perform a page table walk on the page table 40 (operation S290). The physical address PA may be obtained after the page table walk (operation S140). If the last used context identifier and the virtual address VA match one (at least one) of the second entries in the translation cache 218 (YES in S290), the ATM 260 obtains the physical address PA (operation S140).

Figure 10:
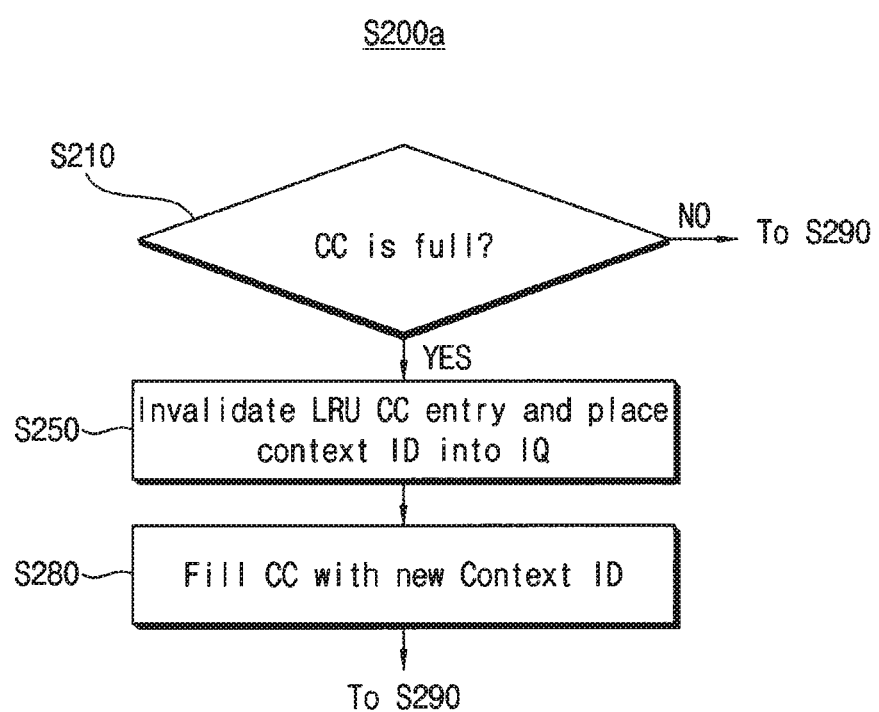
FIG. 10 illustrates that a new context identifier is allocated in FIG. 7.
Figure 11:
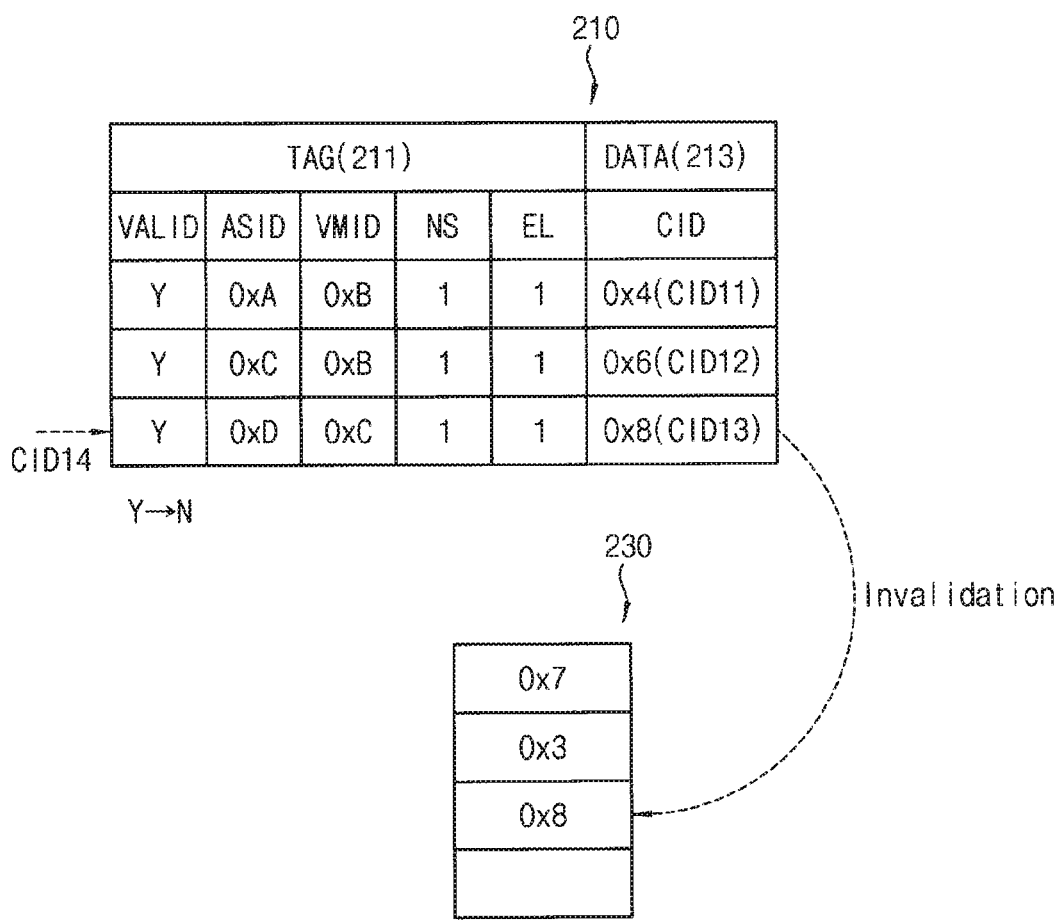
FIG. 11 is an example operation of the MMU that performs operations in FIG. 10.

FIG. 10 illustrates that a new context identifier is allocated in FIG. 7 and FIG. 11 is an example operation of the MMU that performs operations in FIG. 10.

Referring to FIGS. 5, 7, 10 and 11, for allocating a new context identifier to the target context (operation S200*a*), the ATM 260 determines whether the context cache 210 has available space e.g., whether the context cache 210 is full (operation S210).

If the context cache 210 has available space (NO in S210), the ATM 260 controls the page table walker 240 to perform a page table walk on the page table 40 (operation S290).

If the context cache 210 do not has available space (YES in S210), the ATM 260 invalidates (selects) at least one of entries in the context cache 210 based on usage history of the first entries and places (records) a context identifier to be invalidated of the selected entry in the invalidation queue 230 (operation S250). That is, the ATM 260 changes the valid information of a context identifier CID13 having '0x8', which is least recently used, from 'Y' to 'N' and records '0x8' in the invalidation queue 230.

The ATM 260 stores the target context in a location in which the context identifier CDI13 was stored in the context cache 210 and allocates a new context identifier CID14 to the target context (operation S280).

FIG. 12 illustrates that a new context identifier is allocated in FIG. 7 according to example embodiments.

Referring to FIGS. 5, 7 and 12, for allocating a new context identifier to the target context (operation S200*b*), the ATM 260 determines whether the context cache 210 has available space e.g., whether the context cache 210 is full (operation S210).

If the context cache 210 do not has available space (YEC in S210), the ATM 260 determines whether the invalidation queue 230 has available space e.g., whether the invalidation queue 230 is full (operation S220). If the invalidation queue 230 has an available space (NO in S220), the ATM 260 invalidates (selects) at least one of entries in the context cache 210 based on usage history of the first entries and places (records) a context identifier to be invalidated of the selected entry in the invalidation queue 230 (operation S250).

If the invalidation queue 230 does not have an available space, e.g., if the invalidation queue 230 is full (YES in S220), the ATM 260 invalidates at least some of entries in the translation cache 218 based on the invalidation queue 230 and dequeues (flushes) at least some of entries in the invalidation queue 230 such that the invalidation queue 230 has available space (operation S230).

The ATM 260 invalidates (selects) at least one of entries in the context cache 210 based on usage history of the first entries and places (records) a context identifier to be invalidated of the selected entry in the invalidation queue 230 (operation S250). The ATM 260 stores the target context in a location in which the context identifier was stored in the context cache 210 and allocates a new context identifier to the target context (operation S280).

Figure 13A:
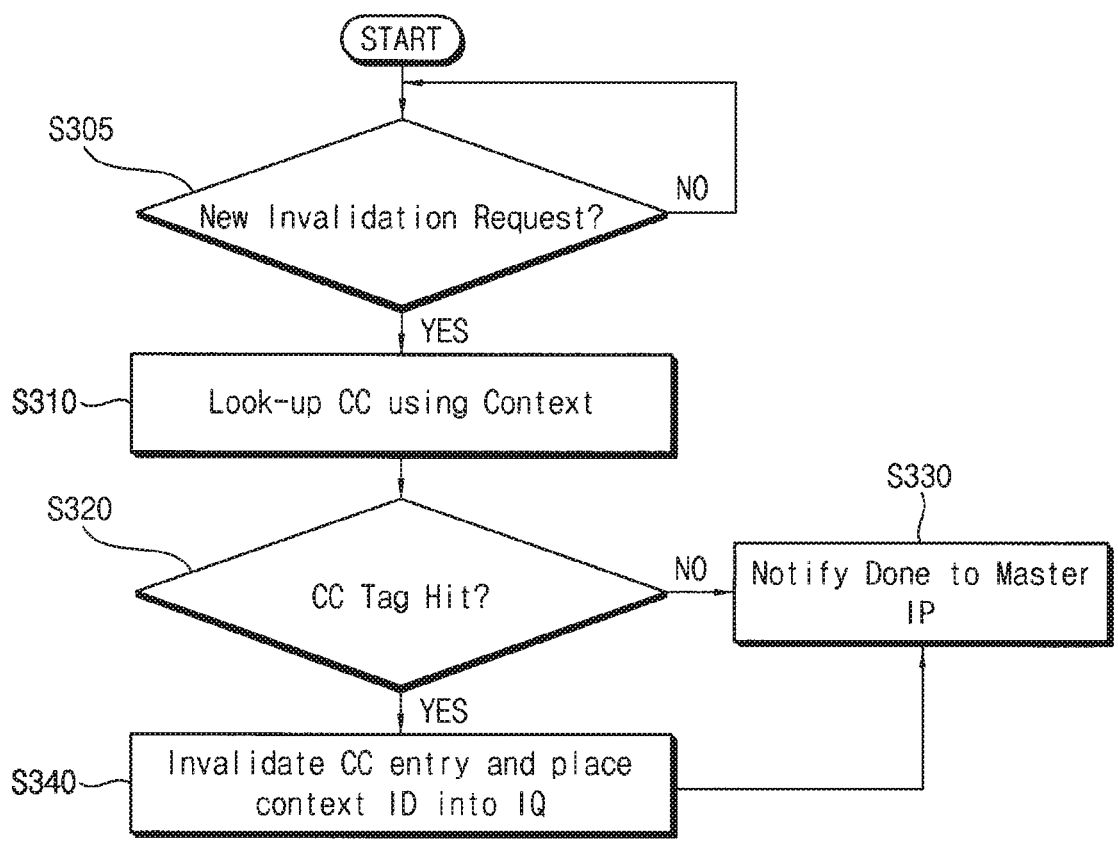
FIG. 13A is a flow chart illustrating an example method of invalidating entries in the context cache in the MMU according to example embodiments.

FIG. 13A is a flow chart illustrating an example method of invalidating entries in the context cache in the MMU according to example embodiments.

Figure 13B:
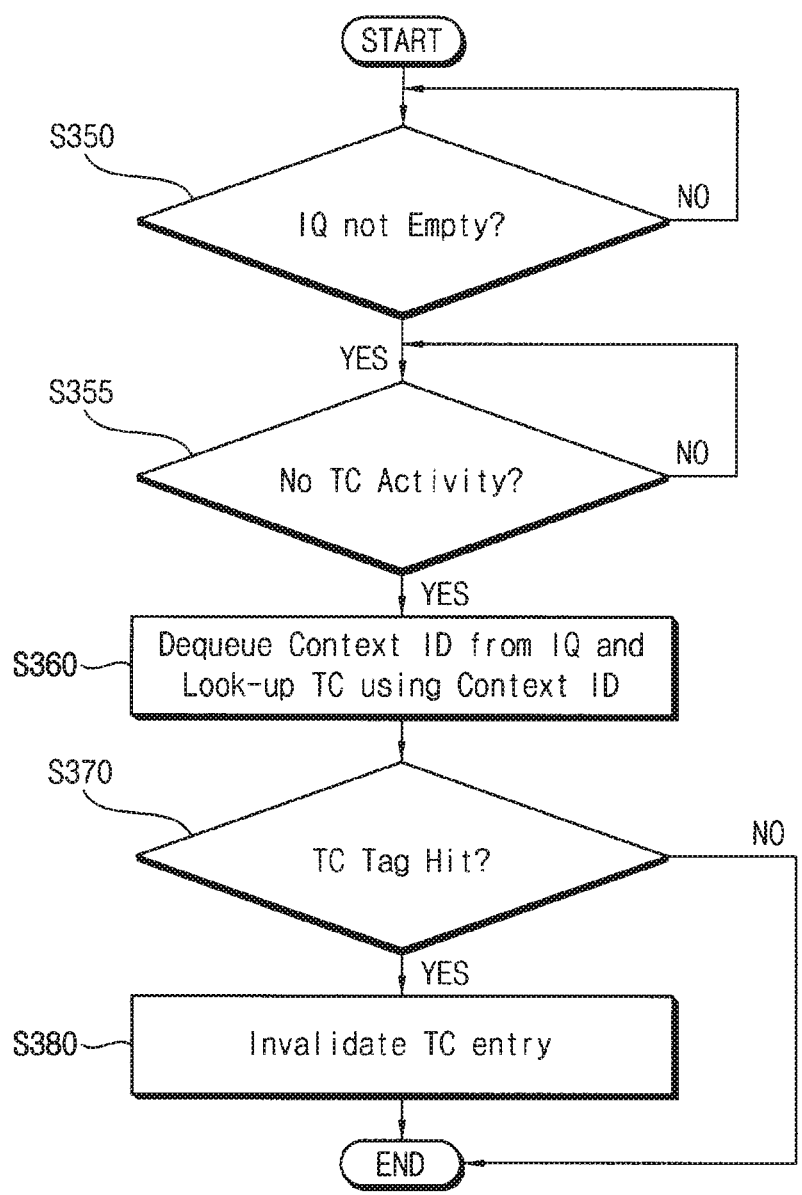
FIG. 13B is a flow chart illustrating an example method of invalidating entries in the translation cache in the MMU according to example embodiments.

Referring to FIGS. 5, 6A and 13B, the ATM 260 determines whether the access request from the master IP 190 corresponds to a new invalidation request to invalidate at least one of entries in the translation cache 118 (operation S305).

If the access request from the master IP 190 corresponds to a new, context-based invalidation request (YES in S305), the ATM 260 inspects the context cache 210 based on a target context included in the invalidation request (operation S310), and determines whether the target context matches one or more of entries in the context cache 210 (operation S320). If the target context does not match any or all of the entries in the context cache 210 (NO in S320), the ATM 260 notifies the master IP 290 of a completion of the invalidation (operation S330).

If the target context matches one or more of the entries in the context cache 210 (YES in S320), the ATM 260 invalidates an entry, corresponding to the target context, in the context cache 210, records (places) a context identifier of the invalidated entry (operation S340) and notifies the master IP 290 of a completion of the invalidation (operation S330).

FIG. 13B is a flow chart illustrating an example method of invalidating entries in the translation cache in the MMU according to example embodiments.

Referring to FIG. 13B, the ATM 260 determines whether the invalidation queue 230 has available space, e.g., determines whether the invalidation queue 230 is not empty (operation S350). If the invalidation queue 230 is not empty (YES in S350), the ATM 260 determines whether the translation cache 218 is not used, e.g., whether there is no activity in the translation cache 218 (operation S355). If the translation cache 218 is not used (YES in S355), the ATM 260 dequeues (extracts) the context identifier from the invalidation queue 230 and inspects the translation cache 218 based on the dequeued the context identifier (operation S360).

The ATM 260 determines whether the dequeued the context identifier matches at least one of entries in the translation cache 218 (operation S370). If the dequeued the context identifier does not match any or all of entries in the translation cache 218 (NO in S370), the process ends. If the dequeued the context identifier matches at least one of entries in the translation cache 218 (YES in S370), the ATM 260 changes valid information of the matched entry (e.g., the matched context identifier) from 'Y' to 'N' (operation S380).

FIGS. 13A and 13B illustrate invalidation entries of the translation cache 218 based on the context. In addition, FIG. 13B illustrate invalidation entries of the translation cache 218 performed in the background when the translation cache 218 is not used.

Figure 14:
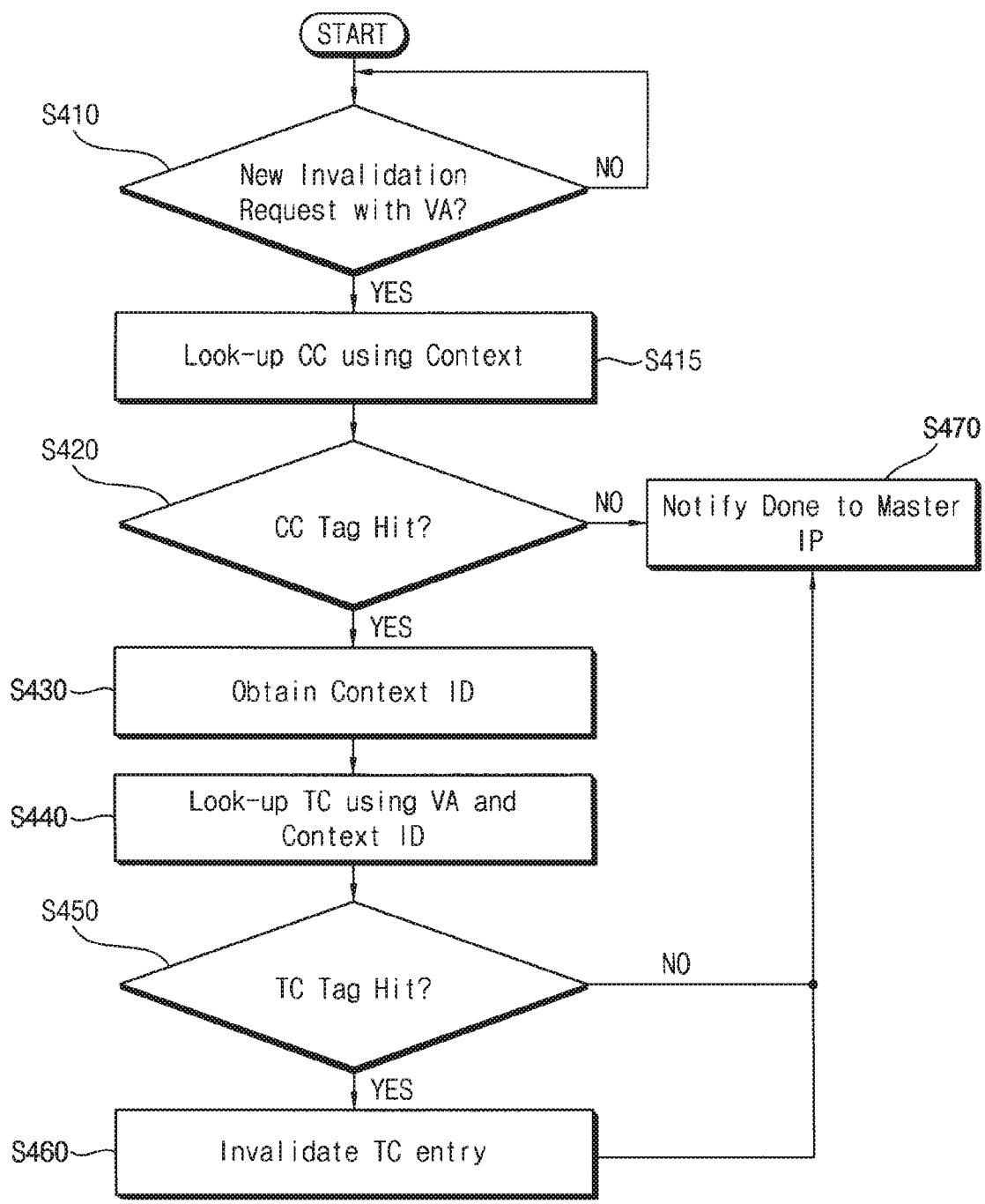
FIG. 14 is a flow chart illustrating another example method of invalidating entries in the translation cache in the MMU according to example embodiments.

FIG. 14 is a flow chart illustrating another example method of invalidating entries in the translation cache in the MMU according to example embodiments.

Referring to FIGS. 5, 6A and 14, the ATM 260 determines whether the access request from the master IP 190 corresponds to a new invalidation request to invalidates at least one of entries in the translation cache 118 (operation S410). In example embodiments, the access request may include a virtual address VA.

If the access request from the master IP 190 corresponds to a new, virtual address-based invalidation request for invalidating an entry having a specific context (YES in S410), the ATM 260 inspects the context cache 210 based on a target context included in the invalidation request (operation S415), and determines whether the target context matches one or more of entries in the context cache 210 (operation S420). If the target context does not match any or all of the entries in the context cache 210 (NO in S420), the ATM 260 notifies the master IP 290 of a completion of the invalidation (operation S470).

If the target context matches one or more of the entries in the context cache 210 (YES in S420), the ATM 260 obtains a context identifier corresponding to the target context (operation S430), and inspects the translation cache 218 based on the obtained context identifier and the virtual address (operation S440). The ATM determines whether the obtained context identifier and the virtual address match at least one of entries in the translation cache 118 (operation S450). If the obtained context identifier and the virtual address do not match all of the entries in the translation cache 118 (NO in S450), the ATM 260 notifies the master IP 290 of a completion of the invalidation (operation S470).

If the obtained context identifier and the virtual address match at least one of the entries in the translation cache 118 (YES in S450), the ATM 260 changes valid information of the matched entry (e.g., the matched context identifier) from 'Y' to 'N' (operation S460) and notifies the master IP 290 of a completion of the invalidation (operation S470).

FIG. 14 illustrates invalidation entries of the translation cache 218 based on the virtual address.

The MMU 200 in the application processor 100 according to example embodiments, may translate a virtual address to a physical address by inspecting the context cache primarily, which stores contexts while avoiding duplicating contexts, and by selectively inspecting the translation cache based on a result of inspecting the context cache. Therefore, a size of the translation cache may be reduced. In addition, performance of the application processor 100 may be enhanced by processing an invalidation request in the background during the translation cache 118 is not used, when the invalidation request designates a context-based invalidation.

Figure 15:
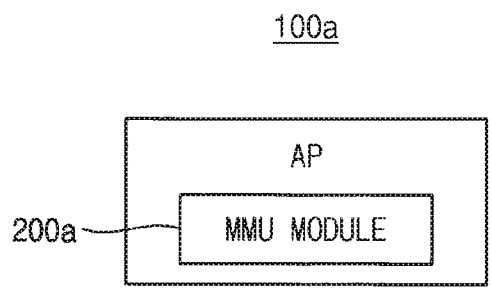
FIG. 15 illustrates another example of the application processor in the SoC in FIG. 1 according to example embodiments.

FIG. 15 illustrates another example of the application processor in the SoC in FIG. 1 according to example embodiments.

Referring to FIG. 15, an application processor 100a may include an MMU module 200a.

The MMU module 200a may include at least one MMU and may translate a virtual address included in a request from the master IP 190 to a physical address.

Figure 16:
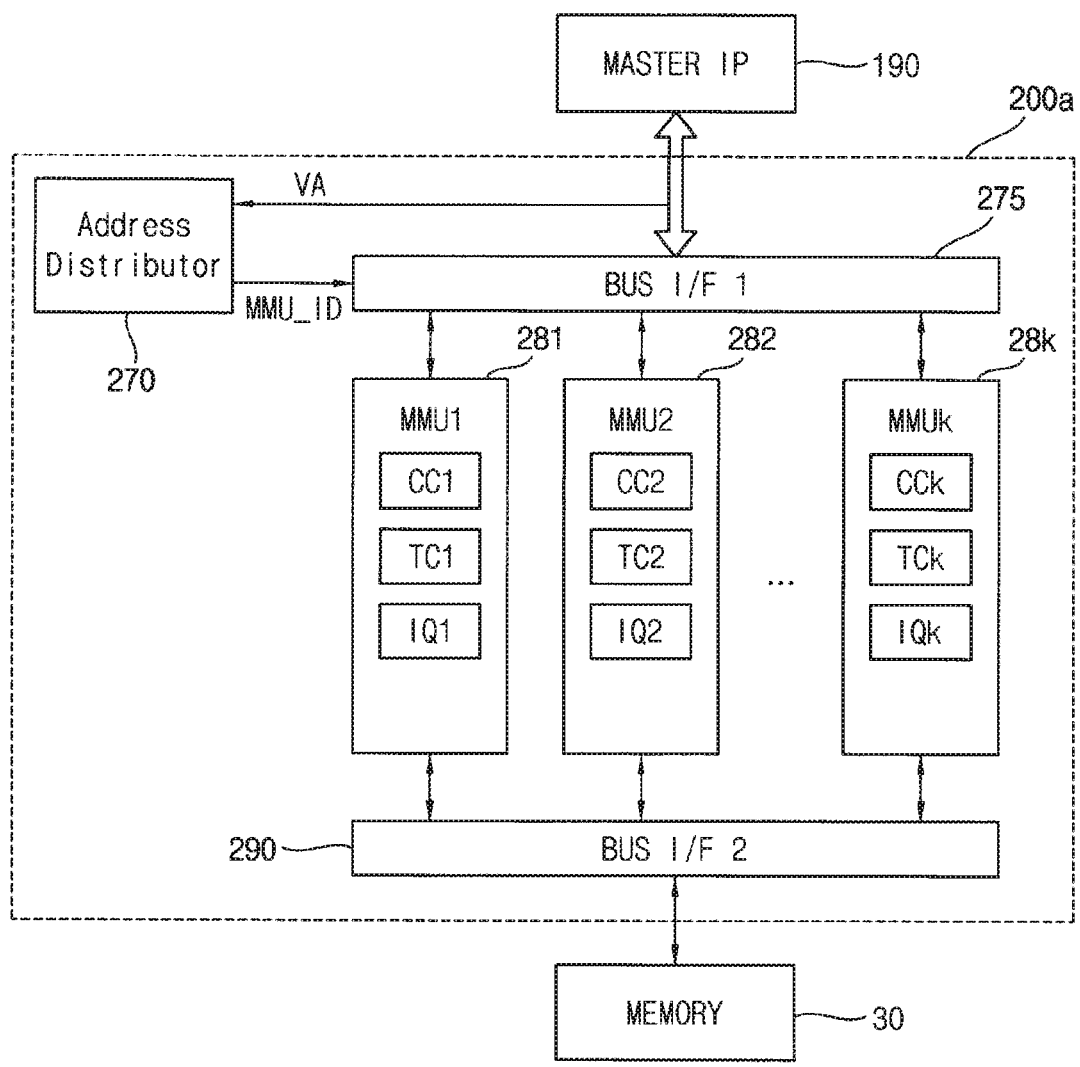
FIG. 16 is a block diagram illustrating an example of the MMU module in FIG. 15 according to example embodiments.

FIG. 16 is a block diagram illustrating an example of the MMU module 200a in FIG. 15 according to example embodiments.

In FIG. 16, the master IP 190 and the memory device 30 are illustrated for convenience of explanation.

Referring to FIG. 16, the MMU module 200a includes an address distributor 270, a first bus interface 275, a plurality of MMUs 281-28k and/or a second bus interface 290. Although not illustrated in FIG. 16, the MMU module 200a may further include a cache that stores data and/or instruction corresponding to the physical address.

The MMU (MMU1) 281 includes a context cache CC1, a translation cache TC1 and/or an invalidation queue IQ1. The MMU (MMU2) 282 includes a context cache CC2, a translation cache TC2 and/or an invalidation queue IQ2. The MMU (MMUk) 28k includes a context cache CCk, a translation cache TCk and/or an invalidation queue IQk. Each of the translation caches TC1~TCk may include a TLB or a walk cache.

The master IP 190 may operate for each working set and may process a plurality of working sets at a time. A working set is a data set stored in the memory device 30. The working set indicates a set of pages that the master IP 190 accesses frequently, for example above a reference number of times in a reference period of time, or the amount of pages that can be loaded from the master IP 190 to the memory device 30. According to example embodiments of the inventive concepts, in the master IP 190 each working set is managed independently from other working sets.

When the master IP 190 performs operations with respect to a plurality of working sets, the address distributor 270 may dynamically allocate an MMU for each of the working sets. The address distributor 270 stores MMU allocation information corresponding to each of the working sets.

Upon receiving a request for a working set from the master IP 190, the address distributor 270 may output an MMU identification MMU_ID of an MMU corresponding to the virtual address VA included in the request to the first bus interface 275 based on the MMU allocation information. first bus interface 275 may transmit the request and data to the MMU corresponding to the MMU identification MMU_ID.

Figure 17:
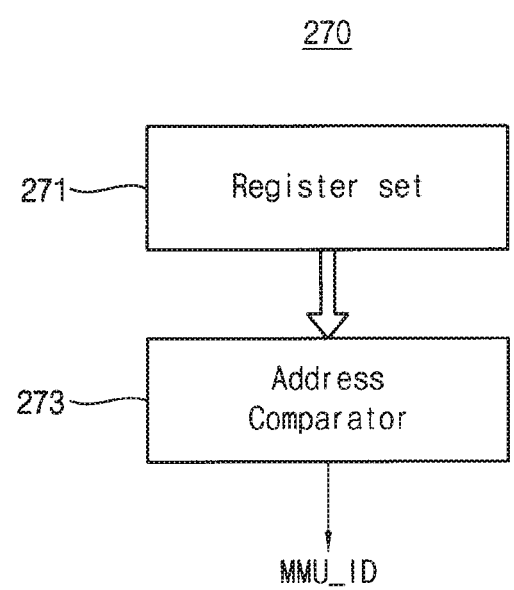
FIG. 17 illustrates an example of the address distributor in FIG. 16 according to example embodiments.

FIG. 17 illustrates an example of the address distributor 270 in FIG. 16 according to example embodiments.

Referring to FIG. 17, the address distributor 270 includes a register set 271 and/or an address comparator 273.

The register set 271 stores the MMU allocation information corresponding to each of the working sets. In other words, the register set 271 stores the MMU allocation information in which virtual addresses VA corresponding to each working set is mapped to an MMU ID. According to example embodiments, the MMU allocation information may include indicator information for distinguishing the virtual addresses VA for each working set. The indicator information may be, for example, a starting point and/or an ending point of the consecutive virtual addresses VA of a working set.

The address comparator 273 may compare the virtual addresses VA of the request received from the master IP 190 with the MMU allocation information. The address comparator 273 may output an MMU identification MMU_ID corresponding to the request as a result of the comparison.

Figure 18:
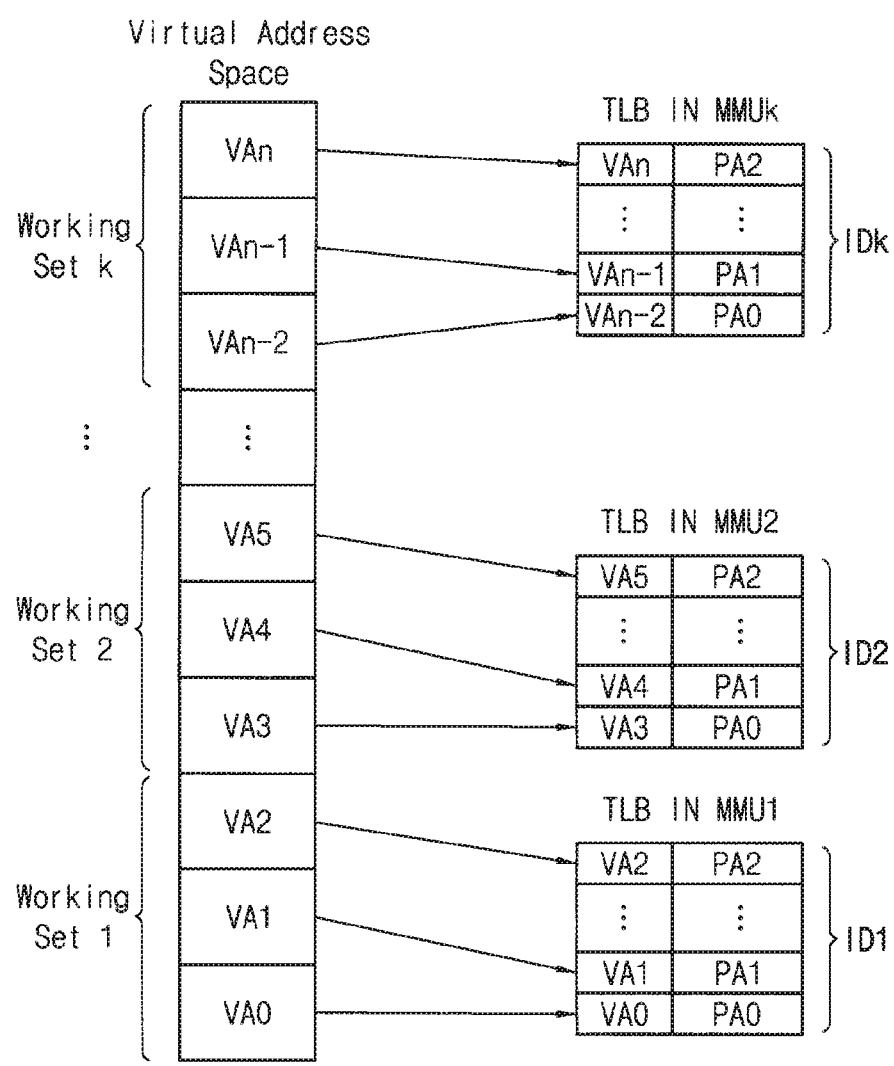
FIG. 18 is a conceptual diagram for explaining the operation of the MMU module in FIG. 16.

FIG. 18 is a conceptual diagram for explaining the operation of the MMU module in FIG. 16.

As illustrated in FIG. 18, first through n-th working sets may include, for example, a plurality of pages referred to frequently, for example above a reference number of times in a reference period of time, in the memory device 30 by the master IP 190, that is, a plurality of adjacent virtual addresses VA. For instance, the first working set includes virtual addresses VA0 through VA2. However, the working sets are managed independently from one another in the operation of the master IP 190. In other words, a single virtual address VA does not belong to two or more working sets. For instance, the virtual addresses VA0 through VAn may be consecutively arranged for the working sets as shown in FIG. 18.

Each MMU translates the virtual address VA of a working set mapped to the MMU into the physical address PA. The address translation may be carried out based on a TLB within the MMU. The physical address PA translated by the MMU may be different from or the same as a physical address translated by another MMU.

When it is assumed that a working set of data to be processed by the master IP 190 is mapped to MMU1 281, the first bus interface 275 receives ID1 of MMU1 281 from the address distributor 270 and transmits a request of the master IP 190 and data to MMU1 281.

MMU1 281 translates the virtual address VA for the request into the physical address PA. When MMU1 281 translates the virtual address VA to the physical address PA, tMMU1 281 inspects the context cache CC1 primarily, and selectively inspects the translation cache TC1 based on a result of inspecting the context cache CC1 and transmits the request translated virtual address VA into the physical address PA to the master IP 190 through the first bus interface 275. In addition, the MMU1 281 transmits the request and the data to the memory device 30 through the second bus interface 290. The second bus interface 290 accesses the physical address PA in the memory device 30 and performs an operation corresponding to the request on the data.

When the master IP 190 starts an operation with respect to another working set while performing an operation with respect to a current working set, one of MMUs that have not been allocated for the current working set in the MMU module 200a is allocated for the new working set and operated independently. As a result, TC miss is reduced as compared to a case where only one MMU is shared for all working sets used by the master IP 190. Accordingly, the hit ratio is increased during the data processing operation of the master IP 190 and the operation speed of the SoC 10 is also increased while mutual influence between working sets is minimized or reduced. In addition, since an MMU is allocated for each working set, the MMU is flexibly operated.

Figure 19:
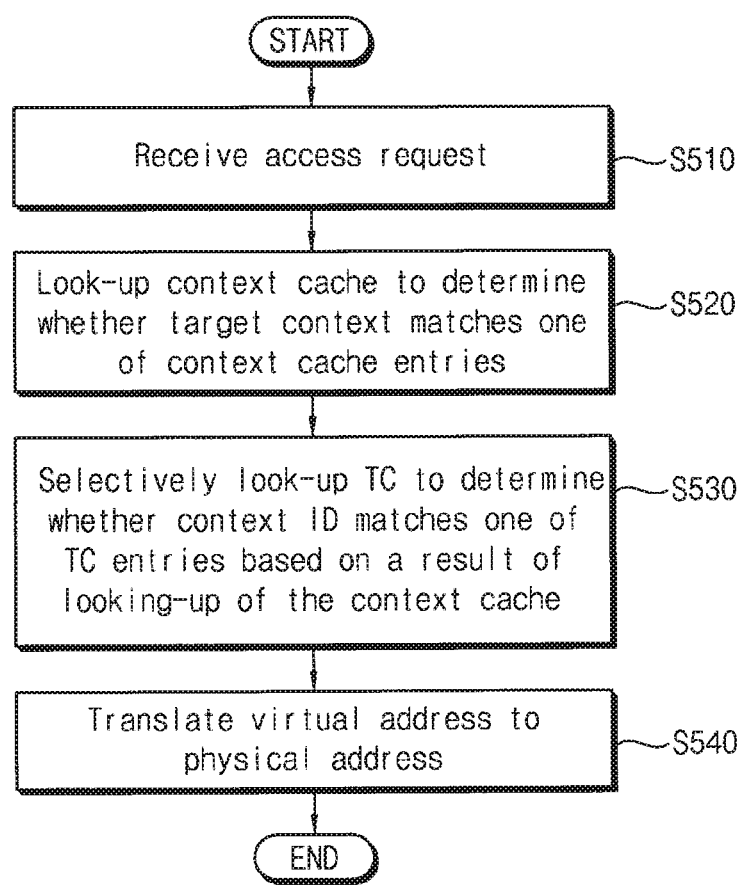
FIG. 19 is a flow chart illustrating a method of operating an MMU in an application processor according to example embodiments.

FIG. 19 is a flow chart illustrating a method of operating an MMU in an application processor according to example embodiments.

Referring to FIGS. 1 through 14 and 19, in a method of operating an MMU 200 in an application processor 100, the ATM 260 in the MMU 200 receives an access request including a target context and a target virtual address from the master IP 190 (operation S510).

The ATM 260 determines whether the target context matches at least one of first entries in a context cache 210 by inspecting the context cache 210 (operation S520). The context cache 210 stores contexts and context identifiers of the stored contexts as a first tag and a first data, respectively, while avoiding duplicating contexts.

The ATM 260 selectively determines whether a target context identifier corresponding to the target context match at least one of second entries in a translation cache 218 by selectively inspecting the translation cache 218 based on inspecting the context cache 210 (operation S530). The translation cache 218 stores the context identifiers and virtual addresses corresponding to the context identifiers as second tag and stores physical addresses corresponding to the virtual addresses as second data.

The ATM 260 translates the target physical address to a target physical address based on the selective determining (operation S540), and outputs the target physical address to the master IP 190.

Figure 20:
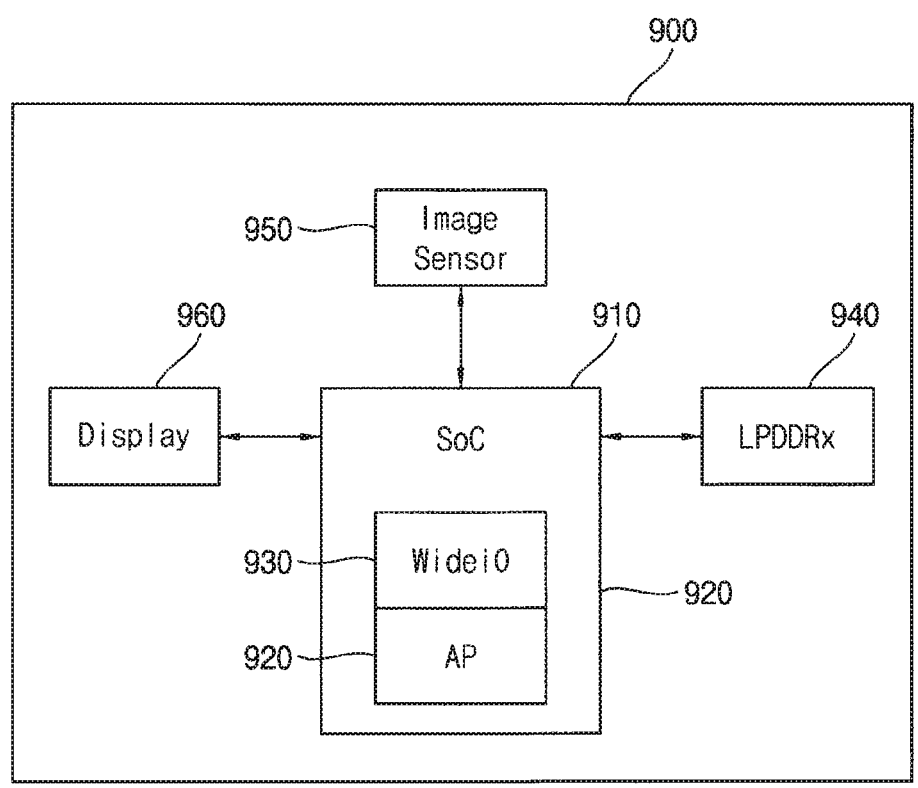
FIG. 20 is a block diagram of a mobile device including an SoC according to example embodiments.

FIG. 20 is a block diagram of a mobile device including an SoC according to example embodiments.

Referring to FIG. 20, a mobile device 900 includes an SoC 910, an LPDDRx memory device 940, an image sensor 950, and/or a display 960. The SoC 910 includes an application processor 920 and/or a WideIO memory 930.

Data stored in the WideIO memory 930 or the LPDDRx memory device 940 may be displayed on the display 960 under the control of the SoC 910. The SoC 910, especially, the application processor 920 may include the MMU 200 in FIG. 5 or the MMU module 200a in FIG. 16.

Therefore, the MMU of the application processor 920 may include a context cache, a translation cache, an invalidation queue and/or an ATM. The ATM may translate a virtual address included in an access request from a master IP to a physical address by inspecting the context cache primarily, which stores contexts while avoiding duplicating contexts, and by selectively inspecting the translation cache based on a result of inspecting the context cache. Therefore, a size of the translation cache may be reduced.

An SoC and a semiconductor device according to the inventive concepts may be packaged as one of various types to be subsequently embedded. For example, an SoC according to the inventive concepts may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi-Chip Package (MCP), Wafer-level Fabricated Package (WFP), and Wafer-Level Processed Stack Package (WSP).

The elements of FIGS. 1 through 20 described above may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The foregoing is illustrative of example embodiments and is not to be construed as limiting thereof. Although example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. An application processor, comprising:
 a memory management unit (MMU) configured to respond to an access request received from a master intellectual property (IP), the access request including a target context and a target virtual address,
 wherein the access request corresponds to an inspection request for translating the target virtual address to a first target physical address,
 wherein the MMU includes:
 a context cache configured to store contexts and context identifiers of the stored contexts as a first tag and a first data, respectively, while avoiding duplicating contexts, the contexts being used in the inspection request;
 a translation cache configured to store a first address and first context identifiers as a second tag and configured to store second addresses as a second data, the first address corresponding to a virtual address used in the inspection request, the first context identifiers corresponding to a first context used in the inspection request, and the second addresses corresponding to the first address and the first context;

an invalidation queue configured to store at least one context identifier to be invalidated, of the context identifiers stored in the translation cache; and an address translation manager (ATM) configured to control the context cache, the translation cache and the invalidation queue, and wherein the ATM is configured:

to determine whether a current context is changed and to inspect the context cache primarily if the current context is changed;

if the changed context does not match any or all of first entries in the context cache according to a result of the inspecting, to allocate a new context identifier to the changed context and to store the new context identifier in the context cache as a first context identifier; and if the changed context matches at least one of the first entries in the context cache according to the result of the inspecting, to store the matched context in the context cache as the first context identifier.

2. The application processor of claim 1, wherein the ATM is configured to translate the first address to the second address by inspecting the context cache in response to the inspection request and selectively inspecting the translation cache based on a result of inspecting the context cache.

3. The application processor of claim 2, wherein the ATM, if the target context matches at least one of first entries in the context cache, is configured to obtain a context identifier corresponding to the target context as a target context identifier.

4. The application processor of claim 3, wherein the translation cache includes a translation lookaside buffer (TLB), wherein the TLB is configured to store virtual addresses as the first address and is configured to store physical addresses corresponding to the virtual addresses as the second address, and wherein the ATM, if the target context identifier and the target virtual address match one of second entries in the TLB, is configured to control the TLB to provide a first physical address corresponding to the target virtual address as a first target physical address.

5. The application processor of claim 4, wherein the MMU further includes a page table walker, wherein the ATM, if the target context identifier does not match any or all of the second entries in the TLB, is configured to control the page table walker to perform a page table walk on a page table that maps a virtual address to a corresponding physical address, and the ATM, if the target context identifier does not match any or all of the first entries in the context cache, is configured to control the page table walker to perform a page table walk on the page table.

6. The application processor of claim 3, wherein the MMU further includes a page table walker, wherein the translation cache includes a walk cache, wherein the walk cache is configured to store partial virtual address of the virtual address as the first address and is configured to store second physical addresses to designate a location corresponding to the first address, of the page table, wherein the ATM is configured to control the page table walker to perform a page table walk on a page table that maps the target virtual address to the first target physical address, and wherein the ATM, if the target context identifier and the target virtual address match one of second entries in the walk cache, is configured to control the walk cache to provide the page table walker with a second physical address corresponding to the first address.

7. The application processor of claim 3, wherein the ATM, if the target context does not match any or all of the first entries in the context cache, is configured to allocate a new context identifier to the target context and to store the target context in the context cache.

8. The application processor of claim 7, wherein, the ATM is configured to determine whether the context cache has an available storage space, if the context cache does not have the available storage space, the ATM is configured to record, in the invalidation queue, a context identifier of at least one of the first entries stored in the context cache based on use history of the first entries and configured to store the target context and the new context identifier in the context cache.

9. The application processor of claim 7, wherein, the ATM is configured to determine whether the context cache has a first available storage space, if the context cache does not have the first available storage space, the ATM is configured to determine whether the invalidation queue has a second available space, if the invalidation queue does not have the second available space, the ATM is configured to dequeue at least one of context identifiers to be invalidated, stored in the invalidation queue, configured to invalidate zero or more of second entries in the translation cache based on the dequeued context identifier and configured to store the target context and the new context identifier in the context cache.

10. The application processor of claim 1, wherein the ATM, in response to the inspection request, is configured:

to inspect the translation cache based on the first context identifier and the virtual address; and to obtain the second address, if at least one of second entries in the translation cache matches the first address corresponding to the first context identifier and the virtual address.

11. The application processor of claim 1, wherein the access request corresponds to a context-based invalidation request for invalidating second entries in the translation cache, and the translation cache stores a context identifier corresponding to the target context as the second tag, and wherein the ATM is configured to:

inspect the context cache in response to the context-based invalidation request;

inspect, selectively, the translation cache based on a result of inspecting the context cache; and notify completion of invalidation of the second entries in the translation cache.

12. The application processor of claim 11, wherein the ATM, if the target context matches at least one of first entries in the context cache, is configured to:

invalidate a target context identifier corresponding to the target context; and record the invalidated target context identifier in the invalidation queue, and wherein the ATM, if the target context does not match any or all of the first entries in the context cache, is configured to notify the completion of the invalidation.

13. The application processor of claim 11, wherein, the ATM is configured to determine whether the invalidation queue is not empty, if the invalidation queue is not empty,
the ATM is configured to determine whether the translation cache has no activity,
the ATM, if the translation cache has no activity, is configured to extract a context identifier recorded in the invalidation queue, configured to inspect the translation cache based on the extracted context identifier and, if the extracted context identifier matches at least one of entries in the translation cache, configured to invalidate the matched entry.

14. The application processor of claim 1, wherein the access request corresponds to a virtual address-based invalidation request for invalidating second entries in the translation cache, and the translation cache stores a context identifier corresponding to the target context as the second tag, and
wherein the ATM is configured to:
perform a first inspection on the context cache based on the target context;
obtain a target context identifier corresponding to the target context, if the target context matches at least one of first entries in the context cache according to a result of the first inspection;
perform a second inspection on the translation cache based on virtual address and the target context identifier; and
invalidate, if the virtual address and the target context identifier match at least one of second entries in the translation cache according to a result of the second inspection, the matched entry.

15. The application processor of claim 1, wherein the ATM, when operating a page table walk, is configured to translate the first address to the second address by inspecting the context cache primarily in response to the inspection request and performing the page table walk based on a result of inspecting the context cache.

16. The application processor of claim 15, wherein the ATM, if the target context matches at least one of first entries in the context cache, is configured to obtain a context identifier corresponding to the target context as a target context identifier, and
wherein the ATM, if the target context identifier and the target virtual address match at least one of second entries in the walk cache, is configured to control the walk cache to provide a physical address corresponding to the target virtual address as the target physical address.

17. A system-on-chip, comprising:
a master intellectual property (IP) configured to output an access request;
an application processor including a memory management unit (MMU) configured to translate a target virtual address to a first target physical address in response to the access request including a target context and the target virtual address; and
a memory device coupled to the MMU, including a page table that stores mapping information between virtual addresses and first physical addresses,
wherein the MMU includes:
a context cache configured to store contexts and context identifier of the stored contexts as a first tag and a first data, respectively, while avoiding duplicating contexts, the contexts being used in an inspection request corresponding to the access request;
a translation cache configured to store a first address and first context identifiers as a second tag and configured to store second addresses as a second data, the first address corresponding to a virtual address used in the inspection request, the first context identifiers corresponding to a first context used in the inspection request, and the second addresses corresponding to the first address and the first context;
an invalidation queue configured to store at least one context identifier to be invalidated, of the context identifiers stored in the translation cache; and
an address translation manager (ATM) configured to control the context cache, the translation cache and the invalidation queue, and
wherein the ATM is configured:
to determine whether a current context is changed and to inspect the context cache primarily if the current context is changed;
if the changed context does not match any or all of first entries in the context cache according to a result of the inspecting, to allocate a new context identifier to the changed context and to store the new context identifier in the context cache as a first context identifier; and
if the changed context matches at least one of the first entries in the context cache according to the result of the inspecting, to store the matched context in the context cache as the first context identifier.

18. A method of operating a memory management unit (MMU) of an application processor, the method comprising:
receiving, by an address translation manager (ATM), an access request including a target context and a target virtual address;
determining, by the ATM, whether the target context matches at least one of first entries in a context cache by inspecting the context cache, wherein the context cache is configured to store contexts and context identifiers of the stored contexts as a first tag and a first data, respectively, while avoiding duplicating contexts;
determining, by the ATM, whether a target context identifier corresponding to the target context match at least one of second entries in a translation cache by selectively inspecting the translation cache based on inspecting the context cache, wherein the translation cache is configured to store the context identifiers and virtual addresses corresponding to the context identifiers as second tag and is configured to store physical addresses corresponding to the virtual addresses as second data;
translating the target virtual address to a corresponding target physical address based on the selective determining:
determining, by the ATM, whether a current context is changed and inspecting, by the ATM, the context cache primarily if the current context is changed;
if the changed context does not match any or all of first entries in the context cache according to a result of the inspecting,
allocating, by the ATM, a new context identifier to the changed context and storing, by the ATM, the new context identifier in the context cache as a first context identifier; and
if the changed context matches at least one of the first entries in the context cache according to the result of the inspecting,
storing, by the ATM, the matched context in the context cache as the first context identifier.

19. The method of claim 18, wherein the translating the target virtual address to the first target physical address includes:

obtaining, by the ATM, a context identifier corresponding to the target context as a target context identifier if the target context matches at least one of first entries in the context cache; and outputting, by the ATM, a physical address corresponding to the target virtual address as the target physical address if the target context identifier and the target virtual address match at least one of second entries in the translation cache.

* * * * *